(12) United States Patent
Yamaoka et al.

(10) Patent No.: US 6,739,295 B1
(45) Date of Patent: May 25, 2004

(54) COMPRESSION IGNITION INTERNAL COMBUSTION ENGINE

(75) Inventors: Shiro Yamaoka, Tokyo (JP); Toshiharu Nogi, Tokyo (JP); Minoru Oosuga, Tokyo (JP); Takuya Shiraishi, Tokyo (JP); Shinji Nakagawa, Tokyo (JP); Yuusuke Kihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/239,050

(22) PCT Filed: Aug. 17, 2000

(86) PCT No.: PCT/JP00/05507

§ 371 (c)(1),
(2), (4) Date: Dec. 31, 2002

(87) PCT Pub. No.: WO02/14665

PCT Pub. Date: Feb. 21, 2002

(51) Int. Cl.$^7$ .................................................. F01L 1/34
(52) U.S. Cl. ........................ 123/90.15; 123/406.41; 123/406.45; 123/406.48; 123/406.55; 123/435
(58) Field of Search .............................. 123/90.15, 704, 123/305, 318, 406.11, 406.45, 406.48, 435, 672, 568.11, 568.14, 184.46, 299, 406.22, 406.41, 406.44, 406.55, 27 R

(56) References Cited

U.S. PATENT DOCUMENTS

| | | |
|---|---|---|
| 5,507,263 A | 4/1996 | Yamazaki et al. |
| 6,230,683 B1 * | 5/2001 | zur Loye et al. ............. 123/435 |
| 6,267,097 B1 * | 7/2001 | Urushihara et al. ......... 123/305 |
| 6,276,334 B1 * | 8/2001 | Flynn et al. ................. 123/435 |
| 6,286,482 B1 * | 9/2001 | Flynn et al. ................. 123/435 |
| 6,354,264 B1 * | 3/2002 | Iwakiri et al. .............. 123/305 |

FOREIGN PATENT DOCUMENTS

| | | |
|---|---|---|
| EP | 0953750 A2 | 11/1999 |
| JP | 57-36319 | 2/1982 |
| JP | 64-34431 | 3/1989 |
| JP | 7-158446 | 6/1995 |
| JP | 10-56413 | 2/1998 |
| JP | 11-6436 | 1/1999 |
| JP | 11-264319 | 9/1999 |
| JP | 11-280507 | 10/1999 |
| JP | 11-311135 | 11/1999 |
| JP | 2000-220458 | 8/2000 |

* cited by examiner

*Primary Examiner*—Thomas Denion
*Assistant Examiner*—Kyle Riddle
(74) *Attorney, Agent, or Firm*—Crowell & Moring LLP

(57) ABSTRACT

It is an object of the present invention to provide a compression ignition internal combustion engine capable of making compatible an increase in compression self-ignition operating area with an optimum output torque control in the operating area and also smoothly switching between a self-ignition combustion and a spark ignition combustion. The compression ignition internal combustion engine operates by switching between the spark ignition combustion using an ignition device and the compression ignition combustion which self-ignites a mixture by piston compression. Variable valve mechanisms vary at least one of the valve timings and valve lifts of an intake valve and an exhaust valve. Intake air is regulated to vary the amount of air intake into a combustion chamber on the upstream side of a combustion chamber inlet of the compression ignition internal combustion engine. The variable valve mechanisms and the intake air regulation are controlled during the compression ignition combustion so as to perform the compression ignition combustion.

39 Claims, 33 Drawing Sheets

FIG.25
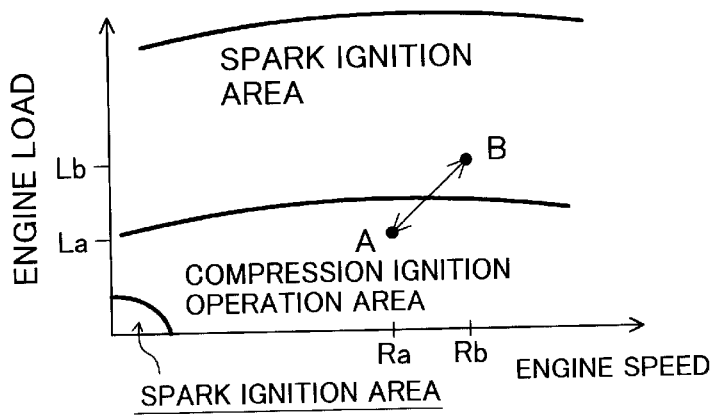
FIG.26A
FIG.26B
FIG.26C
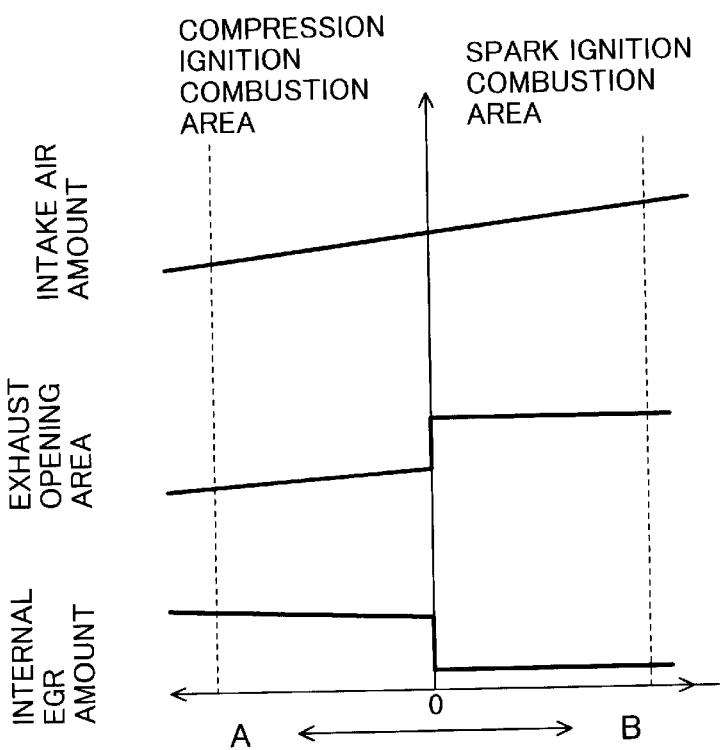

COMPRESSION IGNITION INTERNAL COMBUSTION ENGINE

TECHNICAL FIELD

The present invention relates to a compression ignition internal combustion engine, and more particularly, to a compression ignition internal combustion engine capable of switching a compression ignition combustion and a spark ignition combustion.

BACKGROUND ART

As described in JP-A-10-56413, a compression ignition internal combustion engine adopts a combustion system of compressing and self-igniting a uniformly premixed fuel-air mixture. The compression ignition internal combustion engine can operate in an ultra-lean area (air-fuel ratio of 80 or more) that cannot be operated by a conventional gasoline engine or diesel engine, and decreases flame temperatures and realizes ignition combustion with a uniform fuel-air mixture, and therefore it is an engine that allows drastic reduction of both NOx and soot.

Generally, when a fuel-air premixture is compressed and reached at a certain temperature, a reaction called "low temperature oxidation reaction" whose initial reaction is dehydrogenation of hydrocarbon as a fuel, starts. When this reaction progresses, an elementary reaction called "blue flame" takes place, which leads to self-ignition. Since this ignition takes place at multiple points in the fuel-air mixture simultaneously, the combustion period for the combustion chamber as a whole is by far shorter than combustion by spark ignition of a conventional gasoline engine or a combustion period of injection combustion of a diesel engine. For this reason, this results in a reduction of flame temperature and suppression of NOx generation which is dependent on a duration thereof, which constitutes a factor of realizing low NOx in the compression ignition internal combustion engine.

However, the conventional compression ignition internal combustion engine has a problem that its output torque range is limited to a very narrow range and an engine operation with compression ignition is only realized within quite a limited range of low-load and low-speed rotation. The reason is that the temperature for a fuel-air premixture using hydrocarbon as a fuel to reach self-ignition is said to be 900K or higher and a current gasoline engine whose compression ratio is set to about 10 to 13 is known to have almost no operating area where self-ignition can take place.

Furthermore, the compression ratio can be set as high as that of a diesel engine (16 to 22) and there can be an engine operating area by self-ignition of a fuel-air premixture, but since it is difficult for the conventional engine to control self-ignition timings of the mixture, a combustion period is short and compression self-ignition of the premixture is strongly affected by an air-fuel ratio, etc., its output torque range is limited to a very narrow range, causing a problem that an engine operation by compression ignition can be realized only in quite a limited area of low-load and low-speed rotation.

In contrast, as described, for example, in JP-A-11-280507, an engine is known which flows backward a high-temperature burnt gas (internal EGR) generated in a previous cycle to a combustion chamber by operating a mechanism that makes variable valve timings of intake/exhaust valves, keeps the inside of the combustion chamber at a high temperature through the internal EGR in a low-load area and realizes an operating area by the self-ignition combustion through control over the amount of the internal EGR and real compression ratio and operates by the spark ignition combustion in a high-load area, area.

DISCLOSURE OF THE INVENTION

However, the internal combustion engine described in JP-A-11-280507: has the following problems. That is, the conventional internal combustion engine overlaps the opening periods of intake/exhaust valves to introduce the internal EGR, which causes an amount of the internal EGR to be controlled by the overlapping period of the intake/exhaust valves. The conventional internal combustion engine also controls the intake valve to control ignition timing at the same time. That is, when the opening/closing timings required for the intake valve and exhaust valve vary depending on the engine operating condition, both timings cannot be controlled independently of each other, which causes a problem that the operating area by self-ignition is narrowed.

Furthermore, the conventional engine system that combines the self-ignition combustion and the spark ignition combustion cannot control valve timings and valve lifts of the intake/exhaust valves and the amount of intake air independently of one another when switching a combustion state from the self-ignition combustion to the spark ignition combustion or from the spark ignition combustion to the self-ignition combustion, producing differences in torque causing a problem of making stable driving of a vehicle difficult.

It is an object of the present invention to provide a compression ignition internal combustion engine capable of making compatible an increase in compression self-ignition operating area with an optimum output torque control in the operating area and also smoothly switching between a self-ignition combustion and a spark ignition combustion.

To attain the above object, the present invention provides a compression ignition internal combustion engine for operating by switching a spark ignition combustion using an ignition device and a compression ignition combustion for self-igniting a fuel-air mixture by piston compression, provided with variable valve mechanisms for varying at least one of valve timings and valve lifts of an intake valve and an exhaust valve, intake air regulating means for varying an amount of air intake into a combustion chamber on an upstream side of a combustion chamber inlet of the compression ignition internal combustion engine and control means for controlling the variable valve mechanisms and the intake air regulating means during a compression ignition combustion so as to perform a compression ignition combustion.

Such a configuration makes compatible an increase in the compression self-ignition operating area with an optimum output torque control in this operating area and also allows for smooth switching the self-ignition combustion and the spark ignition combustion.

BRIEF DESCRIPTION OF THE DRAWINGS

FIG. 25 illustrates control of switching between the compression ignition combustion mode and spark ignition combustion mode of the compression ignition internal combustion engine according to the third embodiment of the present invention;

FIGS. 26A, 26B and 26C illustrate control of switching between the compression ignition combustion mode and spark ignition combustion mode of the compression ignition internal combustion engine according to the third embodiment of the present,invention;

BEST MODE FOR CARRYING OUT THE INVENTION

With reference now to FIG. 1 to FIG. 14, a configuration and operation of a compression ignition internal combustion engine according to a first embodiment of the present invention will be explained below.

First, a configuration of the compression ignition internal combustion engine according to the first embodiment will be explained by using FIG. 1.

Figure 1:
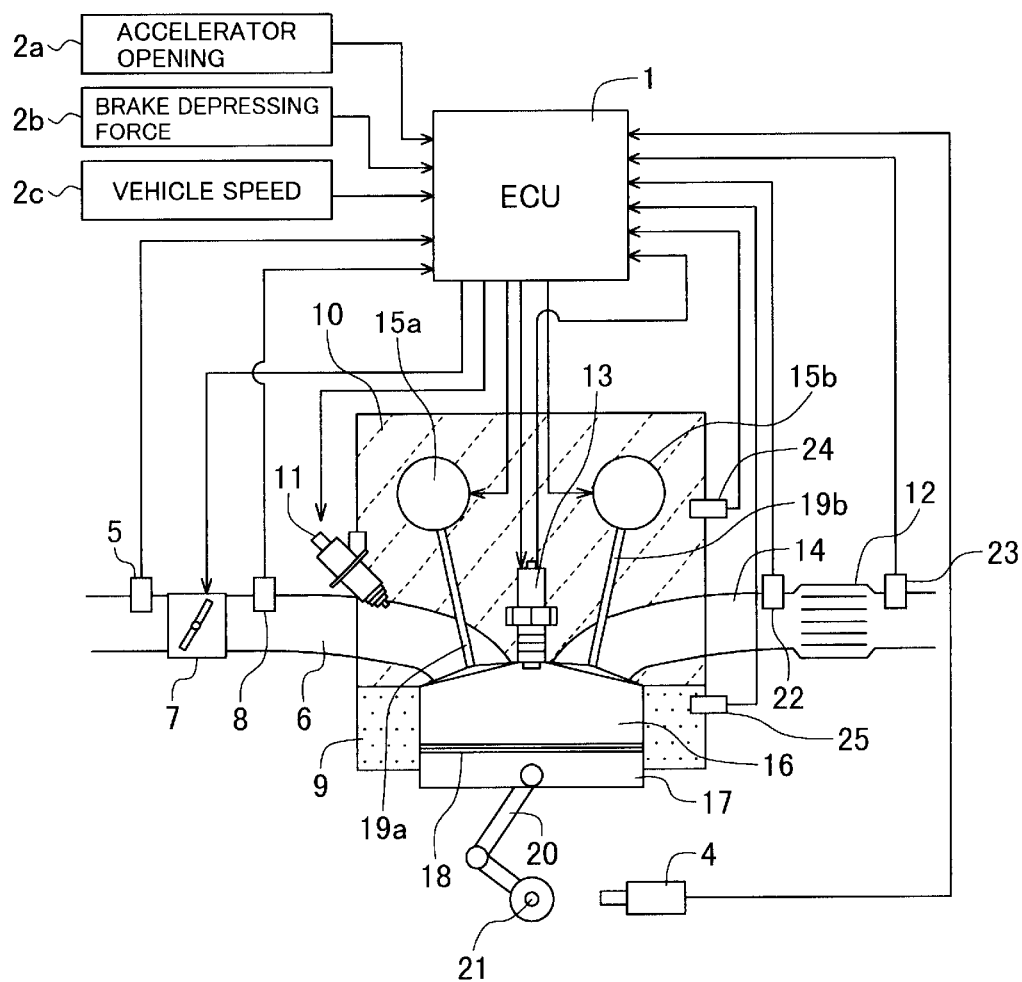
FIG. 1 is a system block diagram showing a configuration of a compression ignition internal combustion engine according to a first embodiment of the present invention.

FIG. 1 is a system block diagram showing the configuration of the compression ignition internal combustion engine according to the first embodiment of the present invention.

The compression ignition internal combustion engine according to the embodiment can operate by switching between a spark ignition combustion using an ignition device and a compression ignition combustion self-igniting a fuel-air mixture by piston compression.

A combustion chamber 16 is formed in a space enclosed by a cylinder block 9, a piston 17 and a cylinder head 10. Reciprocating motion of the piston 17 is transmitted to a crank shaft 21 through a connecting rod 20 and converted to rotary motion. The combustion chamber 16 communicates with an intake port 6 and an exhaust port 14. The path between the intake port 6 and the combustion chamber 16 is opened/closed by an intake valve 19a. On the other hand, the path between the exhaust port 14 and the combustion chamber 16 is opened/closed by an exhaust valve 19b. Valve lifts and the valve opening/closing timings of the intake valve 19a and the exhaust valve 19b are controlled by variable valve mechanisms 15a and 15b respectively.

An ignition plug 13 is provided inside the combustion chamber 16. At the time of the spark ignition combustion, spark discharge occurs from the ignition plug 13 according to an instruction from an engine control unit 1 (hereinafter referred to as "ECU"). At the time of a compression ignition combustion, the ignition plug 13 can also function as an ion current detection device for detecting a combustion condition. The ECU 1 monitors the combustion condition and ignition timings, etc. inside the combustion chamber 16 according to detection signals of the ignition plug 13.

Output values of an accelerator opening detection device 2a and brake depressing force detection device 2b as driver intention detecting means for detecting the intention of a driver who operates a vehicle incorporating the compression ignition internal combustion engine are incorporated into the ECU 1 successively. Output values of a vehicle speed detection device 2c as vehicle driving condition detecting means for detecting a vehicle driving condition are incorporated into the ECU 1 successively. Furthermore, output values from an air flow sensor 5, an intake manifold pressure sensor 8, an engine cooling water temperature sensor 24, an air-fuel ratio sensor 22, a post-catalyst exhaust temperature sensor 23 provided after an catalyst 12 and a crank angle sensor 4 as engine operating state detecting means for detecting an engine operating condition are incorporated into the ECU 1 successively. Here, the air flow sensor 5 is preferably provided with the function of measuring a intake air temperature and a value of the intake air temperature detected by the air flow sensor 5 is also incorporated into the ECU 1 simultaneously.

The ECU 1 calculates a load of the engine based on the output value of the accelerator opening detection device 2a. That is, the accelerator opening detection device 2a also functions as engine load detecting means.

A fuel injection valve 11 is installed inside the intake port 6. In this example, the fuel injection valve 11 is assumed to be placed inside the intake port 6, but it is also possible to use a fuel injection valve of a cylinder internal injection type that can directly inject fuel into the combustion chamber 16.

A intake air regulating device 7 is provided inside the intake port 6. A throttle valve is used as the intake air regulating device 7. As the intake air regulating device 7, it is preferable to use an electronic control throttle valve, but it is also possible to use a mechanical throttle valve connected to an accelerator pedal via a wire.

The ECU 1 determines output torque of the engine based on an accelerator opening signal detected by the accelerator opening detection device 2a and a signal of an engine speed detected by the crank angle sensor 4 and determines the amount of fuel injection from the fuel injection valve 11 and the amount of intake air adjusted by the intake air regulating device 7. The ECU 1 controls the variable valve mechanisms 15a and 15b of the intake valve 19a and the exhaust valve 19b based on the decided amount of intake air and also controls the intake air regulating device 7. By the way, it is known that the compression ignition timing of the air-fuel mixture inside the combustion chamber 16 depends on a temperature history, pressure history inside the combustion chamber 16 and air-fuel ratio of the mixture.

A characteristic configuration of the embodiment is that the compression ignition internal combustion engine is provided with the variable valve mechanisms 15a and 15b of the intake valve 19a and the exhaust valve 19b and the intake air regulating device 7, and that the ECU 1 controls the variable valve mechanisms 15a and 15b and the intake air regulating device 7 according to the engine operating condition. The conventional compression ignition internal combustion engine is designed to control only the variable valve mechanisms of the intake valve and exhaust valve and therefore its compression self-ignition operating area is narrow. On the other hand, the embodiment is designed to further control the amount of intake air and can thereby expand the compression self-ignition operating area.

Then, a method of deciding the combustion mode of the compression ignition internal combustion engine according to the first embodiment will be explained by using FIG. 2.

Figure 2:
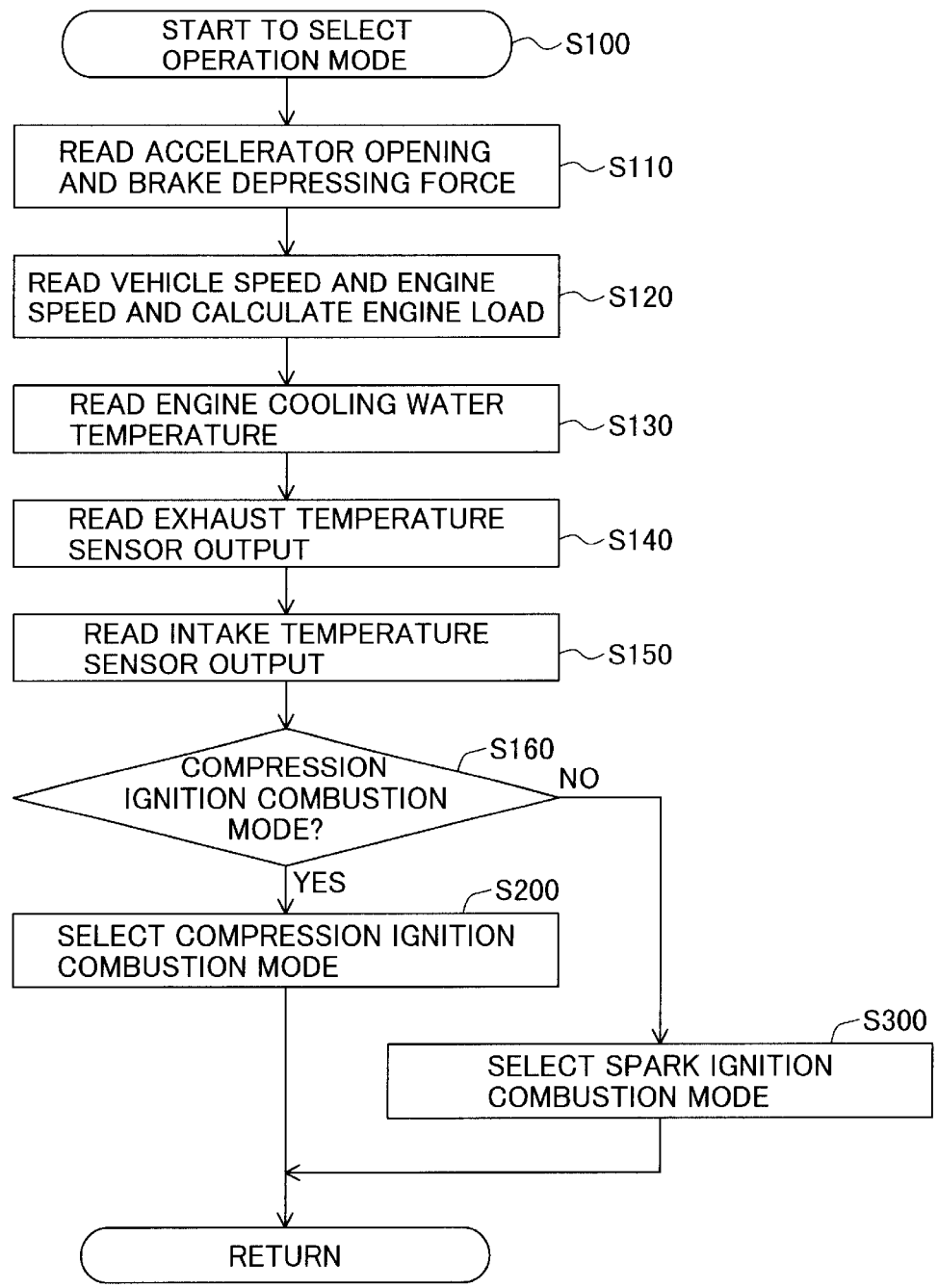
FIG. 2 is a flow chart showing a method of deciding a combustion mode of the compression ignition internal combustion engine according to the first embodiment of the present invention.

FIG. 2 is a flow chart showing a method of deciding a combustion mode of the compression ignition internal combustion engine according to the first embodiment of the present invention.

In step s100, the ECU 1 starts to select an operation mode (combustion mode).

First, in step s110, the ECU 1 takes in output values of the accelerator opening detection device 2a and the brake depressing force detection device 2b, which are the driver intention detecting means, and detects the intention of the driver who operates the vehicle incorporating the compression ignition internal combustion engine.

Then, in step s120, the ECU 1 takes in a vehicle speed which is an output value of the vehicle speed detection device 2c, which is the vehicle driving condition detecting means and an engine speed signal detected by the crank angle sensor 4 to calculate a load of the engine.

Then, in step s130, the ECU 1 reads a cooling water temperature which is an output value of the engine cooling water temperature sensor 24. Furthermore, in step s140, the ECU 1 reads an exhaust temperature, which is an output value of the post-catalyst exhaust temperature sensor 23. Furthermore, in step s150, the ECU 1 reads a intake air temperature by the intake air temperature measuring function provided for the air flow sensor 5.

Then, in step s160, the ECU 1 decides a combustion method, whether a compression ignition combustion mode or a spark ignition combustion mode, based on the output values of the respective sensors and detecting means read in steps silo to s150. Conditions for operating by the compression ignition combustion and conditions for operating by the spark ignition combustion are written in the ECU 1 beforehand to determine a combustion method as respective maps for the accelerator opening, air-fuel ratio, engine speed, intake air temperature, engine cooling water temperature and post-catalyst exhaust temperature sensors. Based on the prewritten maps and the outputs of the sensors, etc., the ECU 1 determines the combustion method.

If the compression ignition combustion mode is selected in step s160, the process moves on to control in the compression ignition combustion mode in step s200. The details of the control in the compression ignition combustion mode will be explained later by using FIG. 3 and subsequent figures. On the other hand, if the spark ignition combustion mode is selected in step s160, the process moves on to control in the spark ignition combustion mode in step s300.

An output torque of the internal combustion engine is determined by the amount of fuel injection and amount of intake air. Therefore, if the amount of fuel injection is written in the ECU 1 beforehand for the output torque of the engine decided according to the intention of the driver, the vehicle driving condition, the engine operating condition and the respective sensor output values, the amount of intake air is controlled. Furthermore, if the amount of intake air is written beforehand in the ECU 1, the amount of fuel injection is controlled.

Figure 7:
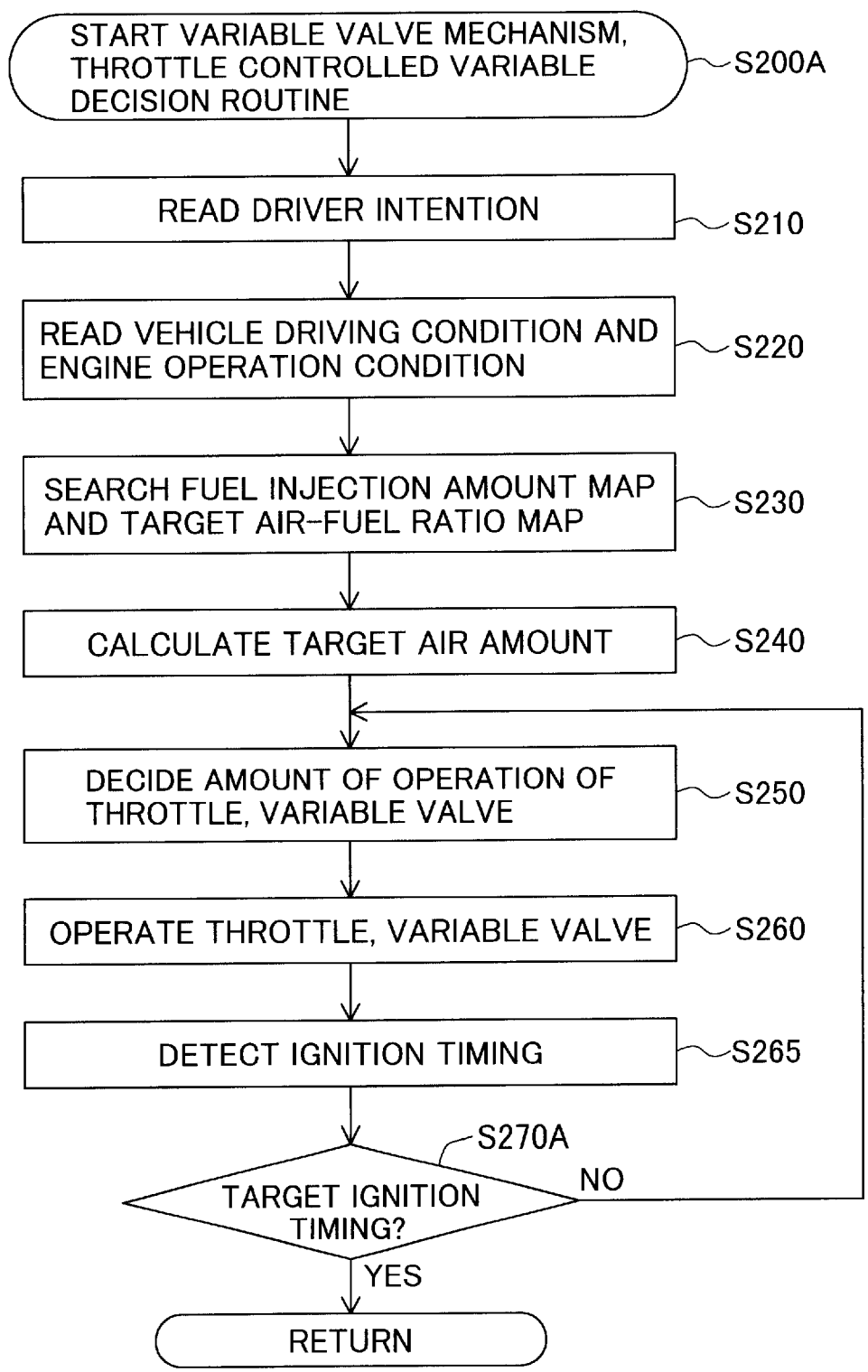
FIG. 7 is a flow chart showing the contents of control of the third method of controlling the compression ignition combustion mode of the compression ignition internal combustion engine according to the first embodiment of the present invention.
Figure 8:
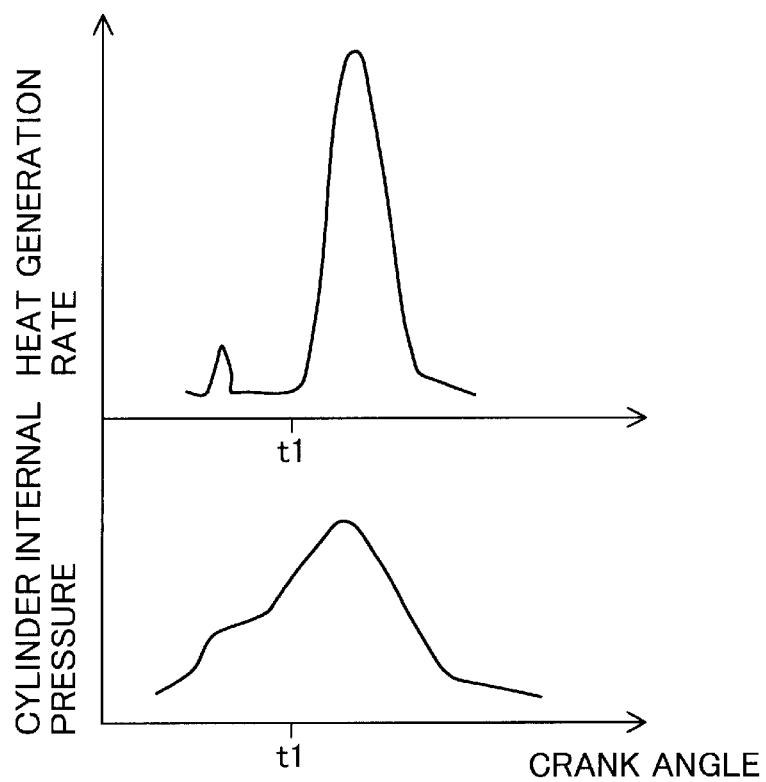
FIGS. 8A and 8B illustrate the principle of detection of ignition timings for the compression ignition internal combustion engine according to the first embodiment of the present invention.
Figure 9:
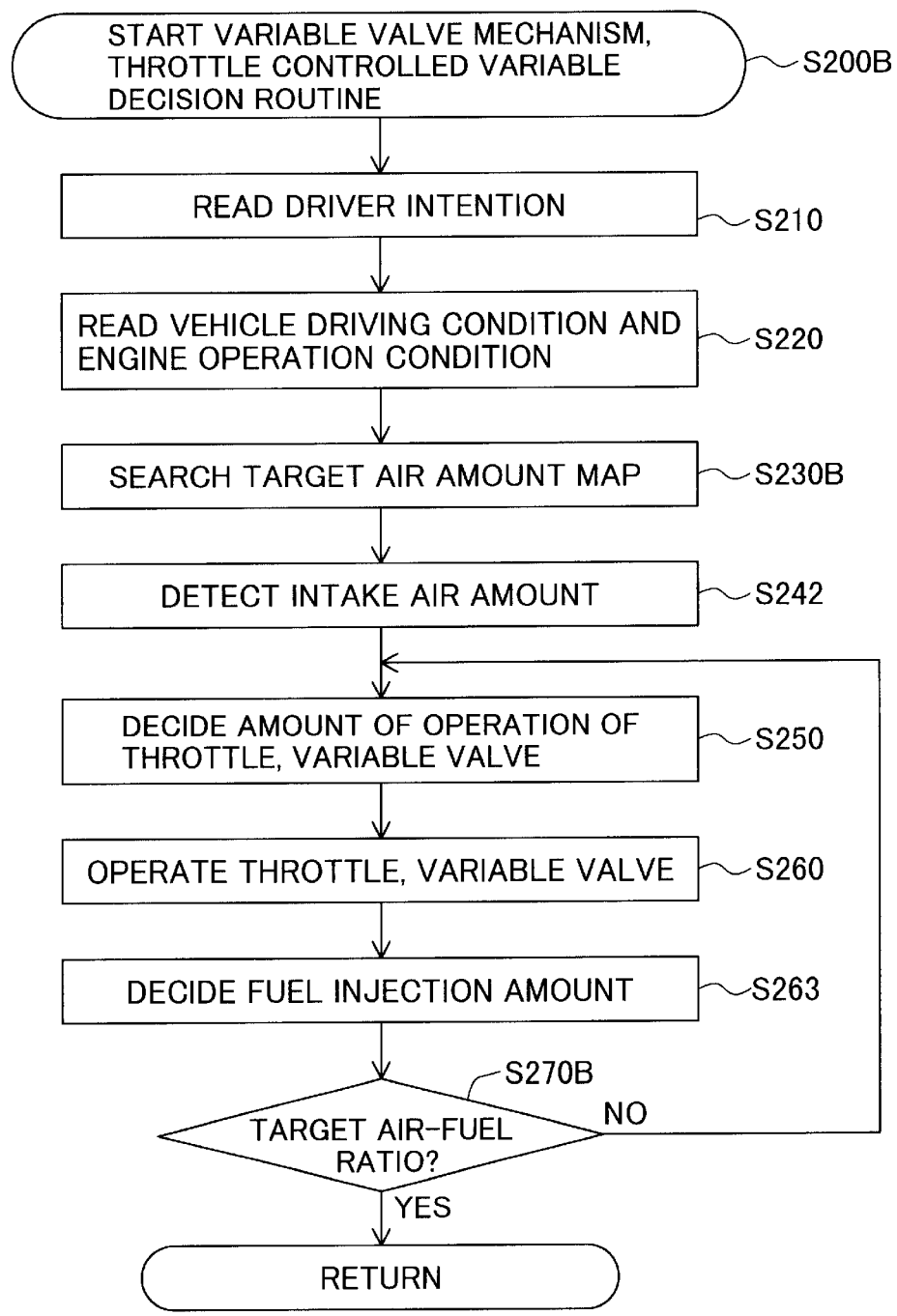
FIG. 9 is a flow chart showing the contents of control of a fourth method of controlling the compression ignition combustion mode of the compression ignition internal combustion engine according to the first embodiment of the present invention.
Figure 10:
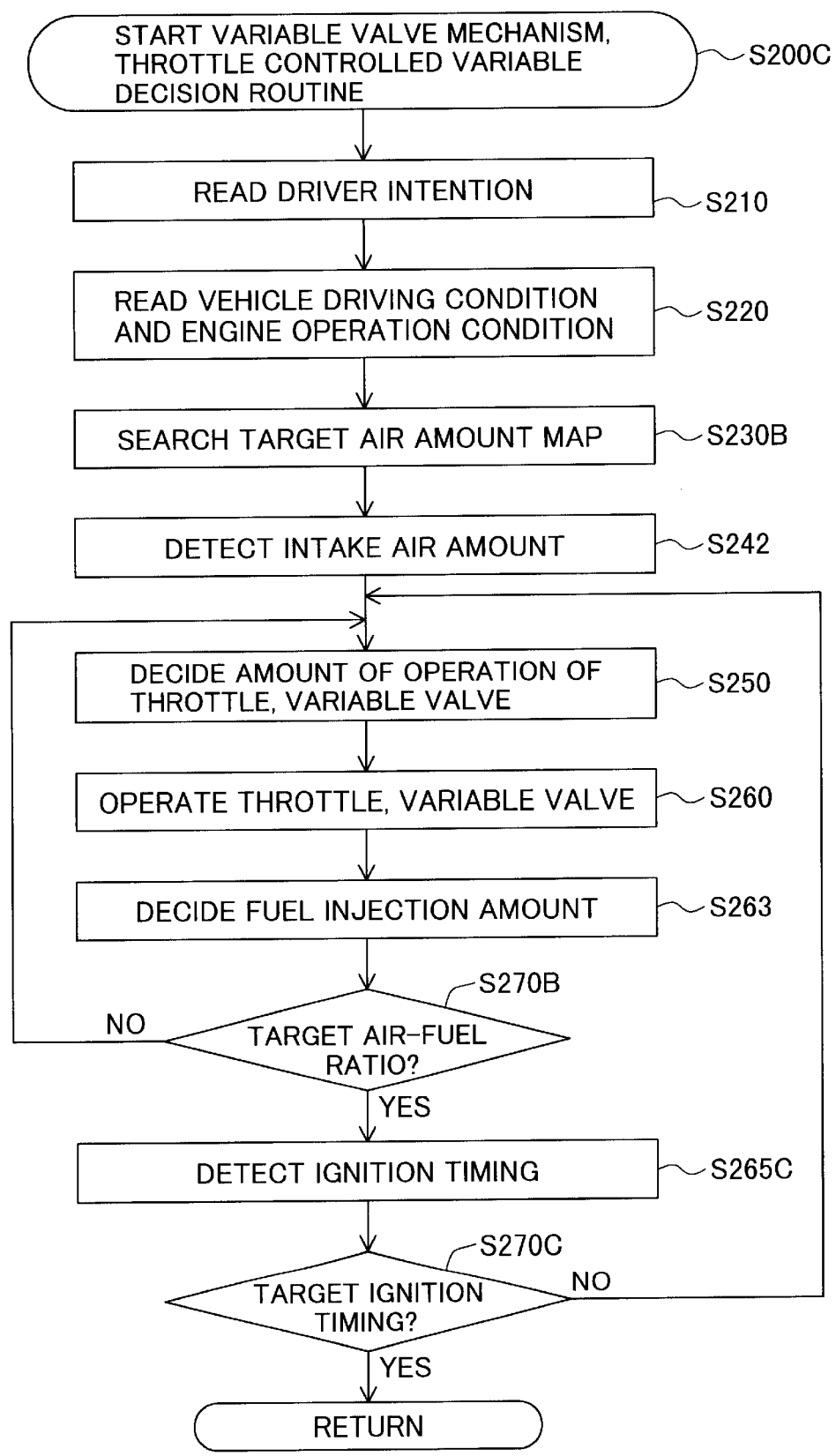
FIG. 10 is a flow chart showing the contents of control of a fifth method of controlling the compression ignition combustion mode of the compression ignition internal combustion engine according to the first embodiment of the present invention.

With reference to FIG. 3 to FIG. 8, a first to third control methods of the compression ignition combustion mode in the case where the amount of fuel injection is written beforehand in the ECU 1 for the required output torque of the engine and the amount of intake air is controlled will be explained. With reference to FIG. 9 and FIG. 10, a fourth and fifth control methods in the compression ignition combustion mode in the case where the amount of intake air is written beforehand in the ECU 1 for the required output torque of the engine and the amount of fuel injection is controlled will be explained. Furthermore, with reference to FIG. 11 and FIG. 12, a sixth and seventh control methods in the compression ignition combustion mode in the case where the controlled variables of the variable valve mechanisms 15a and 15b are written beforehand in the ECU 1 for the required output torque of the engine and the variable valve mechanisms 15a and 15b are controlled will be explained. Furthermore, with reference to FIG. 13 and FIG. 14, an eighth and ninth control methods in the compression ignition combustion mode in the case where the controlled variables of throttle valve opening are written beforehand in the ECU 1 for the required output torque of the engine and the throttle valve opening is controlled will be explained.

Next, a first method of controlling the compression ignition combustion mode of the compression ignition internal combustion engine according to the embodiment will be explained by using FIG. 3.

Figure 3:
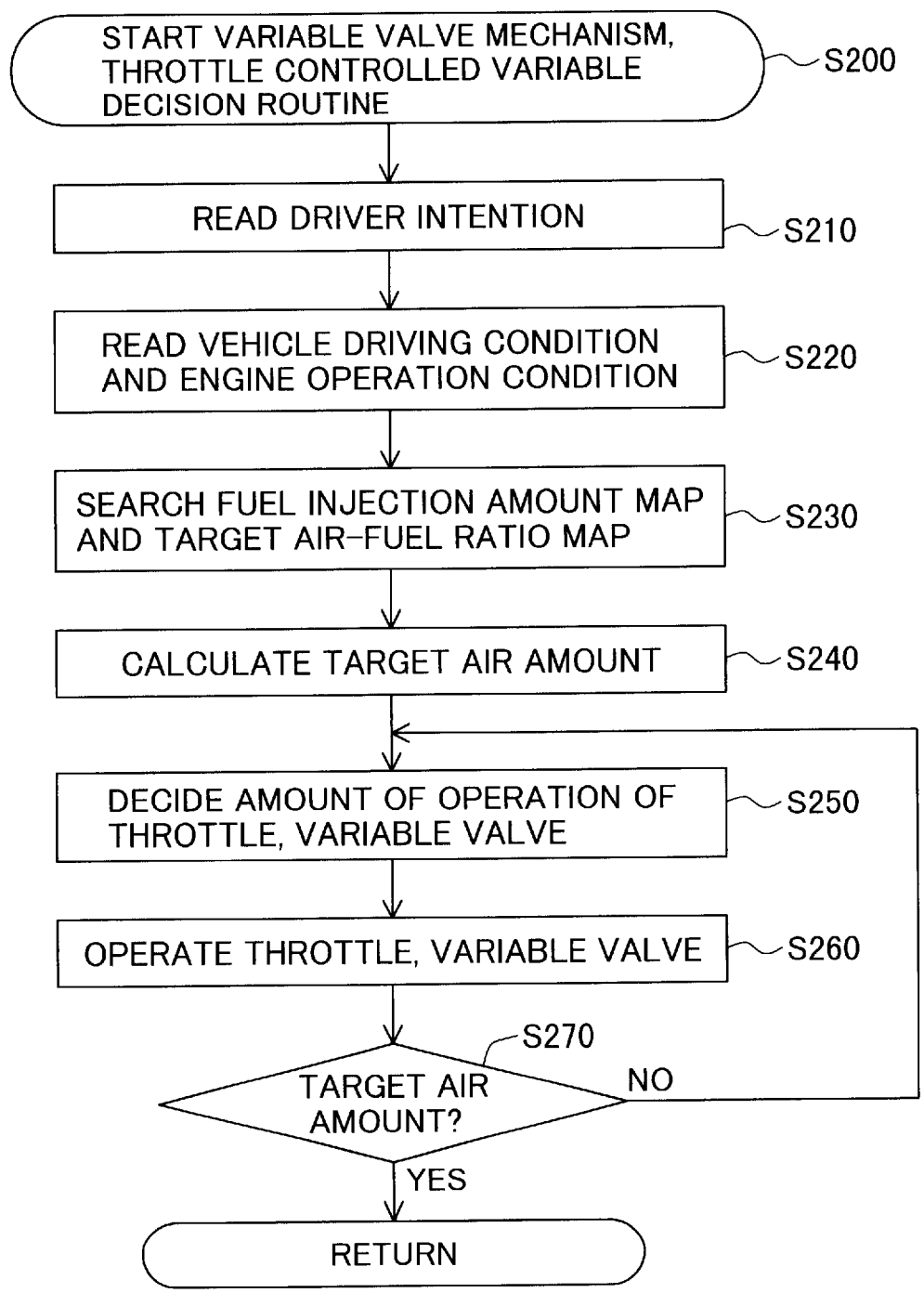
FIG. 3 is a flow chart showing the contents of control of a first method of controlling the compression ignition combustion mode of the compression ignition internal combustion engine according to the first embodiment of the present invention.

FIG. 3 is a flow chart showing the content of control of the first method of controlling the compression ignition combustion mode of the compression ignition internal combustion engine according to the first embodiment of the present invention.

In step s200, the ECU 1 starts a variable valve mechanism, throttle valve controlled variable decision routine in the compression ignition combustion mode.

First, in step s210, the ECU 1 reads output values of the accelerator opening detection device 2a and the brake depressing force detection device 2b as the intention of the driver.

Then, in step s220, the ECU 1 takes in an output value of the vehicle speed detection device 2c as the vehicle driving condition and takes in output values of the accelerator opening detection device 2a, the air-fuel ratio sensor 22, the crank angle sensor 4, the air flow sensor 5 and intake air temperature sensor mounted on the air flow sensor 5, the engine cooling water temperature sensor 24 and the post-catalyst exhaust temperature sensor 23 as the engine operating conditions.

Then, in step s230, the ECU 1 decides the output torque based on the output values read in step s210 and s220, searches for the fuel injection amount map and target air-fuel ratio map stored in the ECU 1 beforehand and selects the amount of fuel injection and the target air-fuel ratio.

Then, in step s240, the ECU 1 decides a target amount of air based on the target values of the amount of fuel injection and the target air-fuel ratio selected in step s230.

Then, in step s250, the ECU 1 decides amounts of operation of the throttle valve 7, the variable valve mechanisms 15a and 15b of the intake/exhaust valves according to the output value of the air flow sensor 5, the output value of the intake air temperature sensor in the air flow sensor 5 and the output value of the crank angle sensor 4. Since it is known that the compression ignition timing of the air-fuel mixture in the combustion chamber 16 depends on the temperature history, the pressure history and the air-fuel ratio of the mixture of the combustion chamber 16, it is possible to determine the amounts of operation of the variable valve mechanisms 15a and 15b of the intake valve and the exhaust valve and the intake air regulating device 7 with these output values of the sensors. That is, the timing of closing the intake valve 19a for realizing the optimum ignition timing is decided according to the decided amount of intake air, the amount of internal EGR and the air-fuel ratio.

Then, in step s260, the ECU 1 operates the throttle valve 7 and the variable valve mechanisms 15a and 15b of the intake/exhaust valves based on the amounts of operation decided in step s250.

Here, the first method of controlling the intake/exhaust valves in the compression ignition combustion mode of the compression ignition internal combustion engine according to the embodiment will be explained by using FIG. 4.

Figure 4:
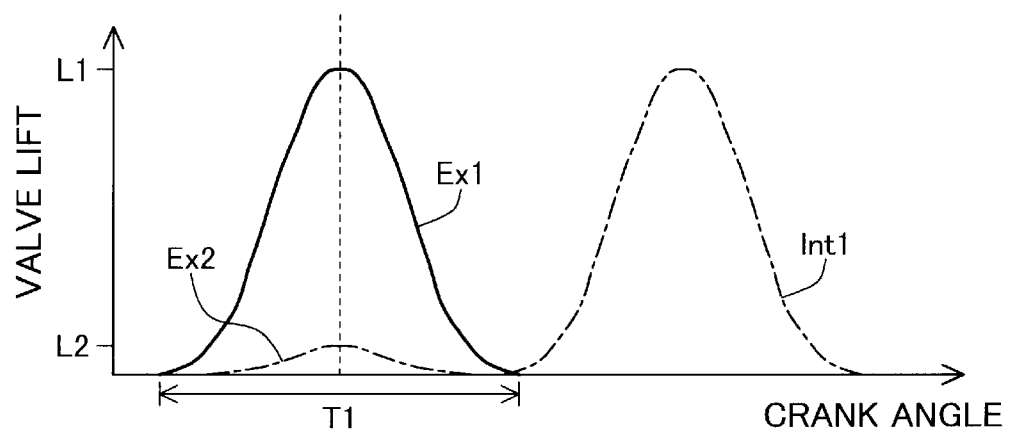
FIG. 4 is a schematic view of lifts of intake/exhaust valves in a compression ignition combustion mode of the compression ignition internal combustion engine according to the first embodiment of the present invention.

FIG. 4 is a schematic view of lifts of the intake/exhaust valves in the compression ignition combustion mode of the compression ignition internal combustion engine according to the first embodiment of the present invention.

In FIG. 4, the horizontal axis shows a crank angle and the vertical axis shows valve lifts of the intake valve and the exhaust valve.

The lift level of the exhaust valve during the spark ignition combustion is as shown with solid line Ex1 in the drawing and suppose the maximum value of the level of the valve lift is L1. On the other hand, the lift level of the intake valve is as shown with single-dot dashed line Int1 and suppose the maximum value of the level of the valve lift is L1.

On the other hand, the lift level of the exhaust valve 19b during the compression ignition combustion is as shown with dotted line Ex2 in the drawing and suppose the maximum value of the level of the valve lift is controlled by the variable valve mechanism 15b to L2, a value smaller than that during the spark ignition combustion. On the other hand, as in the case of the spark ignition combustion, the lift level of the intake valve 19a is as shown with single-dot dashed line. Int1 and the maximum value of the level of valve lift is L1.

That is, in the embodiment, a predetermined amount of exhaust gas is trapped by narrowing the area of the path between the exhaust port 14 and the combustion chamber 16, that is, the area of the exhaust opening and an amount of heat necessary for self-ignition is secured by enthalpy of the exhaust gas. Here, the total thermal energy of the internal EGR is defined by both the amount of the internal EGR itself and the exhaust gas temperature which reaches a peak during a combustion at a theoretical air-fuel ratio (e.g., close to a air-fuel ratio of 14.7 in the case of gasoline), and, therefore the valve lift level L is adjusted based on the output value of the air flow sensor 5 and the output value of the air-fuel ratio sensor 22 to secure the amount of heat necessary for the compression ignition.

When two or more exhaust valves 19b are placed at the combustion chamber 16, the lift levels of the two valves are controlled independently each other, which allows more accurate control of the amount of internal EGR. At this time, it is also possible to provide a temperature gradient in the combustion chamber 16 and control ignition timings by using a difference in the exhaust gas flow rate in the communication area between the exhaust port 14 and combustion chamber 16, generating a flow in the combustion chamber 16 and controlling the condition of a mixture of new air and the internal EGR gas.

Here, a second method of controlling the intake/exhaust valves in the compression ignition combustion mode of the compression ignition internal combustion engine according to the embodiment will be explained.

Figure 5:
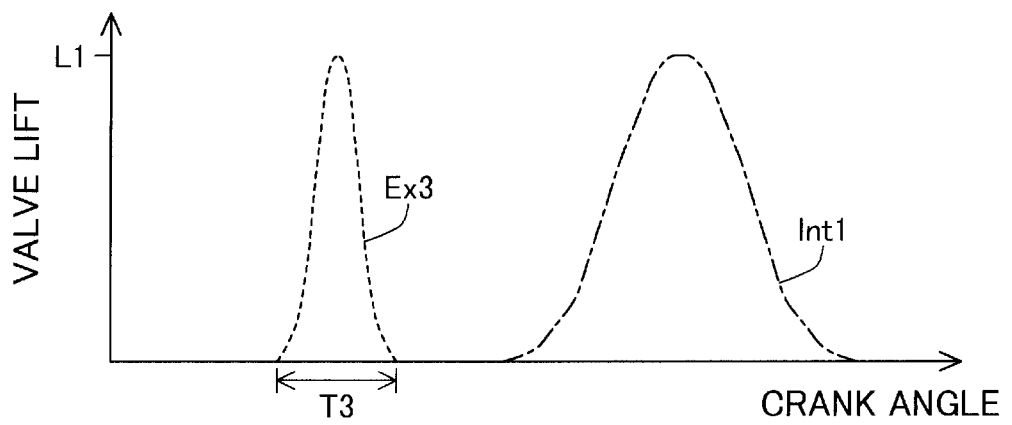
FIG. 5 is:another schematic view of lifts of intake/exhaust valves in a compression ignition combustion mode of the compression ignition internal combustion engine according to the first embodiment of the present invention.

FIG. 5 is another schematic view of lifts of the intake/exhaust valves in the compression ignition combustion mode of the compression ignition internal combustion engine according to the first embodiment of the present invention.

In addition to the method of reducing the level of valve lift of the exhaust valve as explained in FIG. 4, it is also possible to control the variable valve mechanism 15b so as to shorten the time of opening of the exhaust valve 19b as another method of trapping the exhaust gas.

In FIG. 5, the horizontal axis shows a crank angle and the vertical axis shows valve lifts of the intake valve and the exhaust valve.

The lift level of the exhaust valve 19b during a compression ignition combustion is as shown with dotted line Ex3 in the drawing and the maximum value of the level of valve lift is assumed to be lift level L1 as in the case of a spark ignition combustion. However, the time of opening of the exhaust valve 19b is set to T3 by the variable valve mechanism 15b. The opening time T3 of the exhaust valve 19b is controlled to be a smaller value than the opening time T1 of the exhaust valve during the spark ignition combustion shown in FIG. 4. The lift level of the intake valve 19a is as shown with single-dot dashed line Int1 as in the case of a spark ignition combustion and the maximum value of the level of the valve lift is L1.

That is, in the embodiment, a predetermined amount of exhaust gas is trapped by narrowing the area of the path between the exhaust port 14 and the combustion chamber 16, that is, the area of the exhaust opening and the amount of heat necessary for self-ignition is secured by enthalpy of the exhaust gas. Here, the total thermal energy of the internal EGR is defined by both the amount of the internal EGR itself and the exhaust gas temperature which reaches a peak during a combustion at a theoretical air-fuel ratio (e.g., close to an air-fuel ratio of 14.7 in the case of gasoline), and therefore the opening time T3 of the exhaust valve is adjusted based on the output value of the air flow sensor 5 and the output value of the air-fuel ratio sensor 22 to secure the amount of heat necessary for the compression ignition.

Here, it is desirable to control the variable valve mechanism 15b so that the time of opening of the exhaust valve 19b does not overlap with the opening time of the intake valve 19a. This is because when both the intake valve 19a and the exhaust valve 19b are open, the exhaust gas of the intake port 6 also flows back, making it difficult to control the amount of the internal EGR.

By the way, when two or more exhaust valves 19b are placed at the combustion chamber 16, the opening times of the two valves are controlled independently of each other, which allows more accurate control of the amount of internal EGR. At this time, it is also possible to provide a temperature gradient in the combustion chamber 16 and control the ignition timing by using a difference in the exhaust gas flow rate in the communication area between the exhaust port 14 and the combustion chamber 16, generating a flow in the combustion chamber 16 and controlling the condition of a mixture of new air and the internal EGR gas.

Returning to FIG. 3, in step s270, the ECU 1 compares the output value of the air flow sensor 5 with the amount of air decided by the target air-fuel ratio and controls feedback of the throttle valve 7 and the variable valve mechanisms 15a and 15b so as to have the same values. At this time, the closing timing of the intake valve 19a has been decided in step s250 and subsequent control of the amount of intake air is performed using valve lifts of the intake valve 19a or the throttle valve 7.

By the way, there is a plurality of combinations of the opening of the throttle valve 7, the valve timings and the valve lifts of the intake valve 19a and the exhaust valve 19b to realize the target amount of air in step s240. In this case, it is desirable to perform control to attain a combination which will maximize the opening throttle valve 7 so as to realize a combination with the best fuel efficiency. This is because, when the opening of the throttle valve 7 is small, a negative pressure occurs inside the intake port 6 and the engine works negatively, that is, a so-called pumping loss is generated, which reduces the fuel efficiency.

As explained above, the embodiment can secure the amount of internal EGR and determine appropriate ignition timings using the variable valve mechanisms 15a and 15b and further correct the amount of intake air using the throttle valve 7, and can thereby perform an engine operation best suited to the required torque. Thus, the embodiment can expand the compression ignition combustion operating area.

Then, a third method of controlling the compression ignition combustion mode of the compression ignition internal combustion engine according to the first embodiment of the present invention will be explained by using FIG. 6 to FIG. 8.

First, the configuration of the compression ignition internal combustion engine according to the embodiment will be explained by using FIG. 6.

Figure 6:
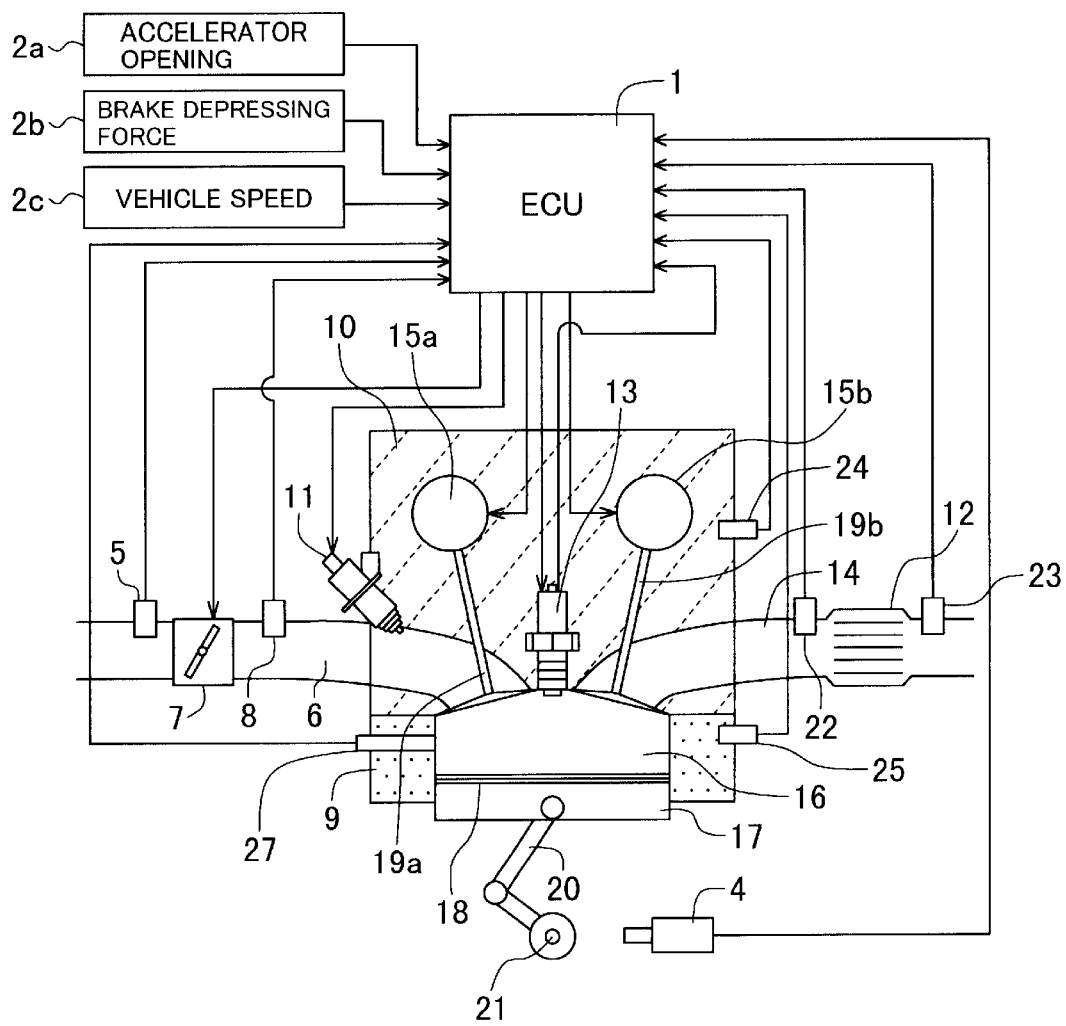
FIG. 6 is a system block diagram showing a configuration for implementing a third method of controlling the compression ignition combustion mode of the compression ignition internal combustion engine according to the first embodiment of the present invention.

FIG. 6 is a system block diagram showing a configuration for implementing the third method of controlling the compression ignition combustion mode of the compression ignition internal combustion engine according to the first embodiment of the present invention. By the way, in FIG. 6, the same reference numerals as those in FIG. 1 denote the same parts.

In the embodiment, a pressure sensor 27 is placed in the combustion chamber 16 in addition to the configuration shown in FIG. 1. The pressure sensor 27 is used to detect an initial pressure and ignition timing. The output values of the pressure sensor 27 are taken into the ECU 1.

Then, the third method of controlling the compression ignition combustion mode of the compression ignition internal combustion engine according to the embodiment will be explained by using FIG. 7.

FIG. 7 is a flow chart showing the contents of control of the third method of controlling the compression ignition combustion mode of the compression ignition internal combustion engine according to the first embodiment of the present invention. By the way, the steps with the same reference numerals as those in FIG. 3 indicate the same contents of control.

In step s200A, the ECU 1 starts a variable valve mechanism, throttle valve controlled variable decision routine in the compression ignition combustion mode with the third control content.

The contents of control in steps s210 to s260 are the same as those explained in FIG. 3. In contrast to the procedure shown in step s270 in FIG. 3 where the output value of the air flow sensor 5 is compared with the amount of air decided by the target air-fuel ratio and the throttle valve 7 and the variable valve mechanisms 15a and 15b are subjected to feedback control so that the two values match, the embodiment includes step s265 and step s270A.

In step s265, the ECU 1 detects ignition timings from the output value of the pressure sensor 27.

Here, a method of detecting ignition timings of the compression ignition internal combustion engine according to the embodiment will be explained by using FIG. 8.

FIGS. 8A and 8B illustrate the principle of detection of ignition timings for the compression ignition internal combustion engine according to the first embodiment of the present invention.

In FIGS. 8A and 8B, the horizontal axis shows a crank angle, the vertical axis in FIG. 8A shows a heat generation rate and the vertical axis in FIG. 8B shows a cylinder internal pressure.

The cylinder internal pressure waveform expressed with solid line in FIG. 8B is taken into the ECU 1 as the output value of the pressure sensor 27. The output value of the pressure sensor 27 is taken in with reference to the crank angle. The ECU 1 can predict ignition timings based on the output value of the pressure sensor 27. Furthermore, the ECU 1 can correctly detect a compression ignition timing from a heat generation rate waveform (FIG. 8A) obtained by differentiating the output value of the pressure sensor 27. That is, FIG. 8A results from differentiation of the waveform shown in FIG. 8B and the timing at which the heat generation rate rises at time t1 is the compression ignition timing.

Then, in step s270A of FIG. 7, the ECU 1 compares the target ignition timing with the actual ignition timing and further operates the throttle valve 7 and the variable valve mechanisms 15av and 15b of the intake/exhaust valves so that the actual ignition timing coincides with the target ignition timing. Here, the target ignition timing is preset in the ECU 1 as a value commensurate with the operating condition. The target ignition timing is equal to the closing timing of the intake valve 19a.

In the above explanation, the ignition timing is detected by the pressure sensor, but it is also possible to detect an ion current using the both ends of the discharge section of the ignition plug 13 as the electrodes and detect the ignition timing based on the output value thereof.

As described above, the embodiment also allows the variable valve mechanisms 15a and 15b to secure the amount of internal EGR and set an appropriate ignition timing and further allows the throttle valve 7 to correct the amount of intake air, and can thereby perform an optimum engine operation with respect to the required torque. Therefore, the embodiment can expand the compression ignition combustion operating area.

Then, a fourth method of controlling the compression ignition combustion mode of the compression ignition internal combustion engine according to the first embodiment of the present invention will be explained by using FIG. 9.

FIG. 9 is a flow chart showing the contents of control of the fourth method of controlling the compression ignition combustion mode of the compression ignition internal combustion engine according to the first embodiment of the present invention. By the way, the steps with the same reference numerals as those in FIG. 3 and FIG. 7 denote the same contents of control.

In the embodiment, the amount of intake air with respect to the required output torque of the engine is written in the ECU 1 beforehand so as to control the amount of fuel injection. The configuration of the compression ignition internal combustion engine according to the embodiment is the same as that shown in FIG. 1.

In step s200B, the ECU 1 starts a variable valve mechanism, throttle valve controlled variable decision routine in the compression ignition combustion mode with the fourth control content.

The contents of control in steps s210 and s220 are the same as those explained in FIG. 3. Furthermore, the contents of control in steps s250 and s260 are also the same as those explained in FIG. 3.

In step s230B, the ECU 1 searches for and decides a target amount of air corresponding to the required output torque of the engine obtained in steps s210 and s220 using the target air amount map written in the ECU 1 beforehand.

Then, in step s242, the ECU 1 takes in the output value of the air flow sensor 5 and detects the amount of intake air.

In steps s250 and s260, as in the case of FIG. 3, the ECU 1 decides the amount of operation of the throttle valve 7 and the variable valve mechanisms 15a and 15b of the intake/exhaust valves according to the output value of the intake air temperature sensor inside the air flow sensor 5 and the engine speed and operates the throttle valve 7 and the variable valve mechanisms 15a and 15b.

Then, in step s263, the ECU 1 decides the amount of fuel injection according to the output value of the air flow sensor 5 read in step s242 and the target air-fuel ratio preset in the ECU 1 and allows the fuel injection valve 11 to inject fuel.

Then, in step s270B, when the air-fuel mixture inside the combustion chamber 16 is burnt by a compression ignition and the burnt gas is exhausted out of the combustion chamber 16, the ECU 1 reads the air-fuel ratio of the combustion gas exhausted into the exhaust port 14 using the air-fuel ratio sensor 22 and feeds back the amount of new fuel injection and the amounts of operation of the throttle valve 7 and the variable valve mechanisms 15a and 15b of the intake/exhaust valves from the output values, and thereby controls the engine operation. In this case, too, by reducing the level of valve lift of the exhaust valve 19b and reducing the area of the exhaust opening, the ECU 1 can secure the amount of heat necessary for ignition through control of the amount of internal EGR.

As explained above, the embodiment can also secure the amount of internal EGR and determine appropriate ignition timing using the variable valve mechanisms 15a and 15b and further correct the amount of intake air using the throttle valve 7, and can thereby perform an engine operation best suited to the required torque. Thus, the embodiment can expand the compression ignition combustion operating area.

Then, a fifth method of controlling the compression ignition combustion mode of the compression ignition internal combustion engine according to the first embodiment of the present:invention will be explained by using FIG. 10.

FIG. 10 is a flow chart showing the contents of control of the fifth method of controlling the compression ignition combustion mode of the compression ignition internal combustion engine according to the first embodiment of the present invention. The steps with the same reference numerals as those in FIG. 3, FIG. 7 and FIG. 9 show the same contents of control.

In the embodiment, the amount of intake air with respect to the required output torque of the engine is written in the ECU 1 beforehand to control the amount of fuel injection. The configuration of the compression ignition internal combustion engine according to the embodiment is the same as that shown in FIG. 6.

The embodiment adds control in steps s265C and s270C to the fourth control method shown in FIG. 9. The contents of control in steps s265C and s270C are equivalent to those in steps s265 and s270A in FIG. 7.

In step s200C, the ECU 1 starts a variable valve mechanism, throttle valve controlled variable decision routine in the compression ignition combustion mode with the fifth control content.

The contents of control in steps s210 to s270B are the same as those explained in FIG. 7.

In step s265C, the ECU 1 detects an ignition timing from the output value of the pressure sensor 27. The method of detecting the ignition timing is the same as that explained in FIG. 8.

In step s270C, the ECU 1 compares the target ignition timing with the actual ignition timing and controls the throttle valve 7 and the variable valve mechanisms 15a and 15b of the intake/exhaust valves so that the actual ignition timing coincides with the target ignition timing. Here, the target ignition timing is preset in the ECU 1 as a value commensurate with the operating condition. The ignition timing during operation can also be detected by detecting an ion current using the both ends of the discharge section of the ignition plug 13 as the electrodes and based on the output value thereof.

As described above, the embodiment also allows the variable valve mechanisms 15a and 15b to secure the amount of internal EGR and set an appropriate ignition timing and further allows the throttle valve 7 to correct the amount of intake air, and can thereby perform optimum engine operation with respect to, the required torque. Therefore, the embodiment can expand the compression ignition combustion operating area.

Then, a sixth method of controlling the compression ignition combustion mode of the compression ignition internal combustion engine according to the first embodiment of the present invention will be explained by using FIG. 11.

Figure 11:
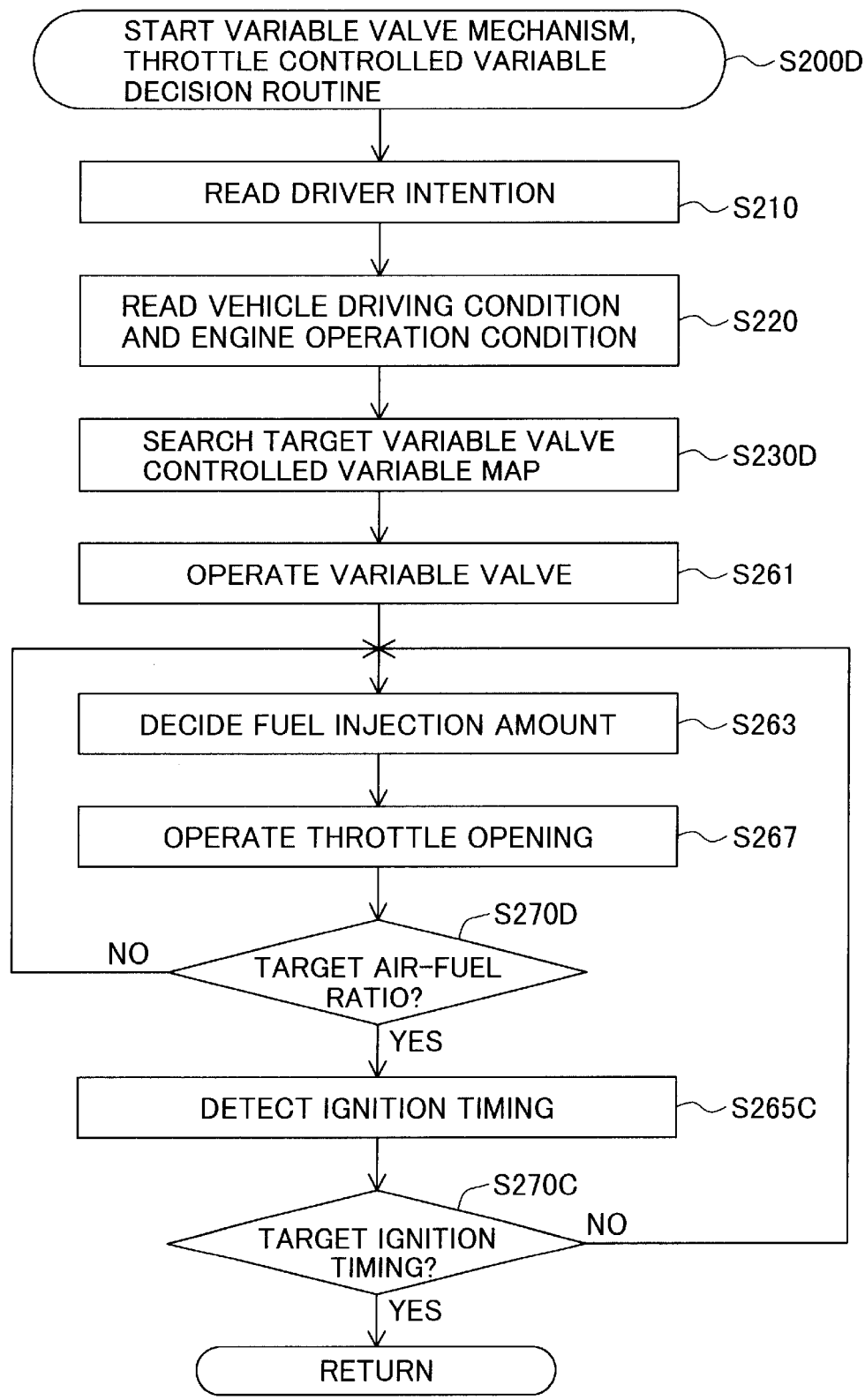
FIG. 11 is a flow chart showing the contents of control of a sixth method of controlling the compression ignition combustion mode of the compression ignition internal combustion engine according to the first embodiment of the present invention.

FIG. 11 is a flow chart showing the contents of control of the sixth method of controlling the compression ignition combustion mode of the compression ignition internal combustion engine according to the first embodiment of the present invention. By the way, the steps with the same reference numerals as those in FIG. 3. FIG. 7, FIG. 9 and FIG. 10 denote the same contents of control.

In the embodiment, the controlled variables of the variable valve mechanisms 15a and 15b with respect to the required output torque of the engine are written in the ECU 1 beforehand so as to control the variable valve mechanisms 15a and 15b. The configuration of the compression ignition internal combustion engine according to the embodiment is the same as that shown in FIG. 6.

In step s200D, the ECU 1 starts a variable valve mechanism, throttle valve controlled variable decision routine in the compression ignition combustion mode with the sixth control content.

The contents of control in steps s210 and s220 are the same as those explained in FIG. 10.

In step s230D, the ECU 1 searches and decides the target variable valve controlled variables corresponding to the required output torque of the engine obtained in steps s210 and s220 using the target variable valve controlled variable map written in the ECU 1 beforehand.

Then, in step s261, the ECU 1 controls the variable valve mechanisms 15a and 15b of the intake/exhaust valves based on the decision in step s230D. That is, in contrast to steps s250 and s260 in FIG. 10 where the ECU 1 decides the amount of operation of the throttle valve 7 and the variable valve mechanisms 15a and 15b of the intake/exhaust valves and operates these throttle valve 7 and the variable valve mechanisms 15a and 15b, the embodiment controls both the throttle valve 7 and the variable valve mechanisms 15a and 15b independently of each other.

Then, in step s263, the ECU 1 decides the amount of fuel injection according to the required output torque of the engine and injects fuel using the fuel injection valve 11.

Then, in step s270D, when the air-fuel mixture inside the combustion chamber 16 is burnt by compression ignition and the burnt gas is exhausted out of the combustion chamber 16, the ECU 1 reads the air-fuel ratio of the combustion gas exhausted into the exhaust port 14 using the air-fuel ratio sensor 22 and feeds back the amount of new fuel injection and the amount of operation of the throttle valve 7 from the output values, and thereby controls the engine operation.

In step s265C, the ECU 1 detects the ignition timing based on the output values of the pressure sensor 27. The method of detecting the ignition timing is the same as that explained in FIG. 8.

In step s270C, the ECU 1 compares the target ignition timing with the actual ignition timing and controls the throttle valve 7 and the amount of fuel injection so that the actual ignition timing coincides with the target ignition timing. Here, the target ignition timing is preset in the ECU 1 as a value commensurate with the operating condition. The ignition timing during operation can also be detected by detecting an ion current using the both ends of the discharge section of the ignition plug 13 as the electrodes and based on the output value thereof.

As described above, the embodiment also allows the variable valve mechanisms 15a and 15b to secure the amount of internal EGR and set appropriate ignition timing and further allows the throttle valve 7 to correct the amount of intake air, and can thereby perform optimum engine operation with respect to the required torque. Therefore, the embodiment can expand the compression ignition combustion operating area.

Then, a seventh method of controlling the compression ignition combustion mode of the compression ignition internal combustion engine according to the first embodiment of the present invention will be explained by using FIG. 12.

Figure 12:
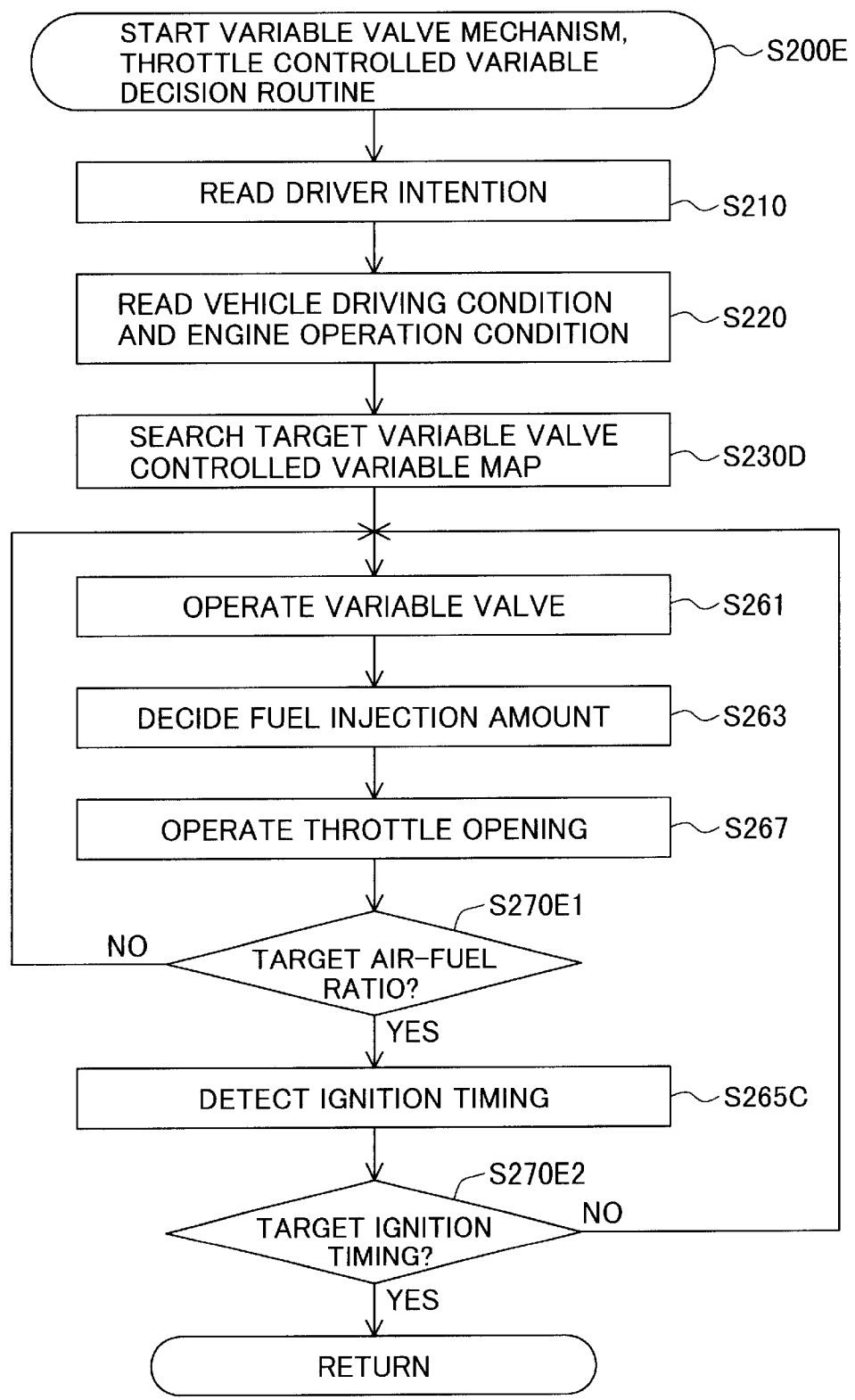
FIG. 12 is a flow chart showing the contents of control of a seventh method of controlling the compression ignition combustion mode of the compression ignition internal combustion engine according to the first embodiment of the present invention.

FIG. 12 is a flow chart showing the contents of control of the seventh method of controlling the compression ignition combustion mode of the compression ignition internal combustion engine according to the first embodiment of the present invention. By the way, the steps with the same reference numerals as those in FIG. 11 denote the same contents of control.

In the embodiment, the controlled variables of the variable valve mechanisms 15a and 15b with respect to the required output torque of the engine are written in the ECU 1 beforehand so as to control the variable valve mechanisms 15a and 15b. The configuration of the compression ignition internal combustion engine according to the embodiment is the same as that shown in FIG. 6.

The embodiment uses the contents of control in steps s270E1 and s270E2 instead of steps s270D and s270C in FIG. 11.

In step s200E, the ECU 1 starts a variable valve mechanism, throttle valve controlled variable decision routine in the compression ignition combustion mode with the seventh control content.

The contents of control in steps s210 to s267 are the same as those explained in FIG. 11.

In step s270E1, when the air-fuel mixture inside the combustion chamber 16 is burnt by the compression ignition and the burnt gas is exhausted out of the combustion chamber 16, the ECU 1 reads the air-fuel ratio of the combustion gas exhausted into the exhaust port 14 using the air-fuel ratio sensor 22 and feeds back the amount of new fuel injection and the amounts of operation of the variable valve mechanisms 15a and 15b and the throttle valve 7 from the output values, and thereby controls the engine operation. At this time, the process is fed back to a point just before step s261. Therefore, the amounts of operation of the variable valve mechanisms 15a and 15b in addition to the content of control in FIG. 11 are also fed back.

In step s265C, the ECU 1 detects an ignition timing from the output value of the pressure sensor 27. The method of detecting the ignition timing is the same as that explained by using FIG. 8.

In step s270E2, the ECU 1 compares the target ignition timing with the actual ignition timing and controls the amounts of operation of the throttle valve 7 and the variable valve mechanisms 15a and 15b and the amount of fuel injection so that the actual ignition timing coincides with the target ignition timing. At this time, the process is fed back to a point just before step s261. Therefore, in addition to the content of control in FIG. 11, the amounts of operation of the variable valve mechanisms 15a and 15b are also fed back.

As described above, the embodiment also allows the variable valve mechanisms 15a and 15b to secure the amount of internal EGR and set appropriate ignition timing and further allows the throttle valve 7 to correct the amount of intake air, and can thereby perform optimum engine operation with respect to the required torque. Therefore, the embodiment can expand the compression ignition combustion operating area.

According to the sixth or seventh control method described in FIG. 11 or FIG. 12, it is possible to write complicated calculations of controlled variables of the variable valve mechanisms 15a and 15b in the ROM beforehand and correct the amount of intake air by the throttle valve 7 with respect to the target air-fuel ratio, and therefore it is possible to perform optimum operation of the engine with respect to the required torque and reduce calculation load of the ECU 1 while securing the performance of the engine operation with low exhaust and low fuel consumption.

Then, an eighth method of controlling the compression ignition combustion mode of the compression ignition internal combustion engine according to the first embodiment of the present invention will be explained by using FIG. 13.

Figure 13:
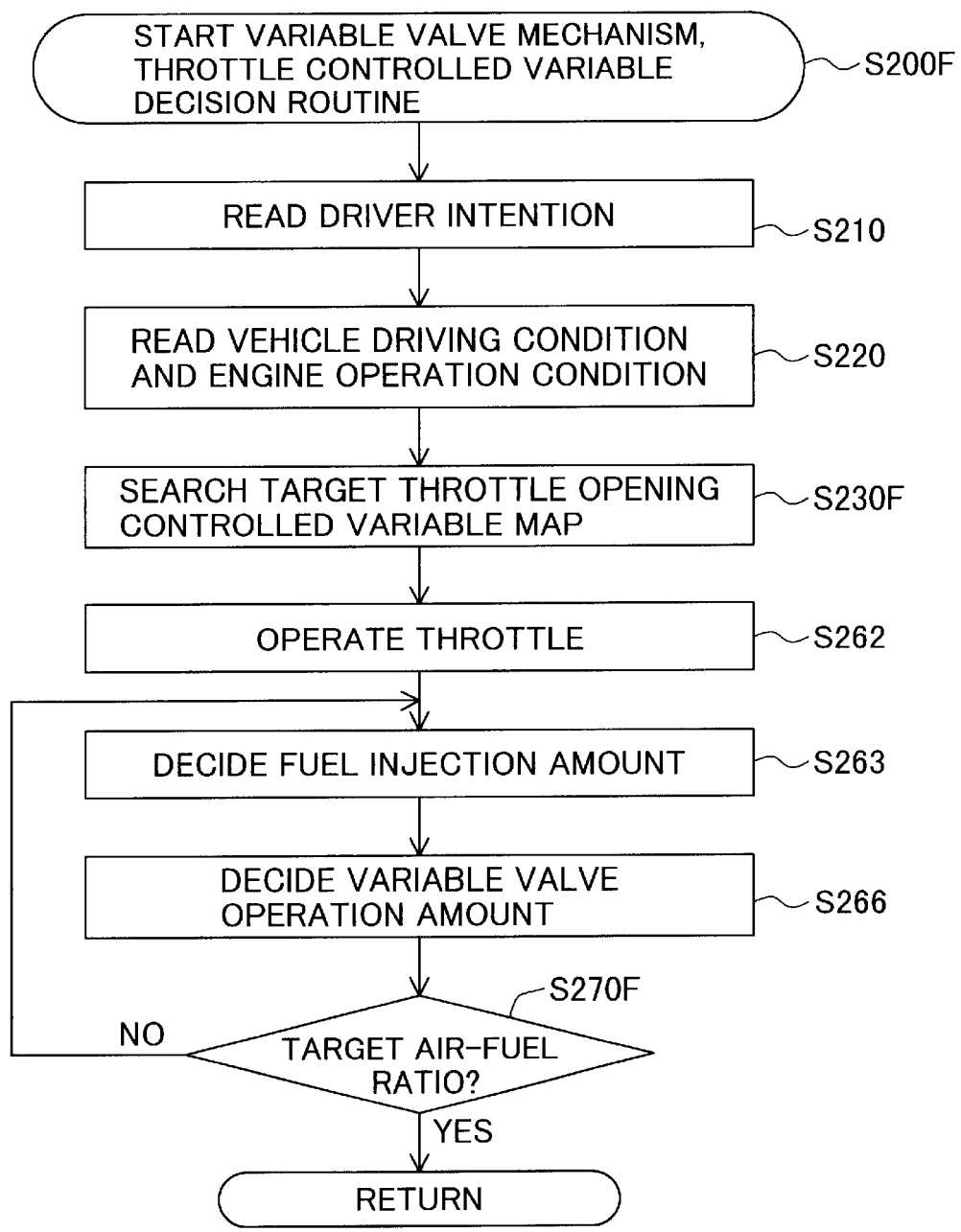
FIG. 13 is a flow chart showing the contents of control of an eighth method of controlling the compression ignition combustion mode of the compression ignition internal combustion engine according to the first embodiment of the present invention.

FIG. 13 is a flow chart showing the contents of control of the eighth method of controlling the compression ignition combustion mode of the compression ignition internal combustion engine according to the first embodiment of the present invention. By the way, the steps with the same reference numerals as those in FIG. 3 to FIG. 12 denote the same contents of control.

In the embodiment, the controlled variable of the throttle valve opening with respect to the required output torque of the engine is written in the ECU 1 beforehand to control the throttle valve opening. The configuration of the compression ignition internal combustion engine according to the embodiment is the same as that shown in FIG. 1.

In step s200F, the ECU 1 starts a variable valve mechanism, throttle valve controlled variable decision routine in the compression ignition combustion mode with the eighth control content.

The contents of control in steps s210 and s220 are the same as those explained in FIG. 3.

In step s230F, the ECU 1 searches and decides the target throttle valve opening controlled variable corresponding to the required output torque of the engine obtained in steps s210 and s220 using the target throttle valve opening controlled variable map written in the ECU 1 beforehand.

Then, in step s262, the ECU 1 controls the opening of the throttle valve 7 based on the controlled variable of throttle valve opening decided in step s230F.

In step s263, the ECU 1 decides the amount of fuel injection corresponding to the required output torque of the engine and injects fuel by the fuel injection valve 11.

Then, in step s267, the ECU 1 decides the amounts of operation of the variable valve mechanisms 15a and 15b according to the output value of the air flow sensor 5, the output value of the intake air temperature sensor inside the air flow sensor 5 and the engine speed.

Then, in step s270F, when the air-fuel mixture inside the combustion chamber 16 is burnt by compression ignition and the burnt gas is exhausted out of the combustion chamber 16, the ECU 1 reads the air-fuel ratio of the combustion gas exhausted into the exhaust port 14 using the air-fuel ratio sensor 22 and feeds back the amount of new fuel injection and the amounts of operation of the variable valve mechanisms 15a and 15b of the intake/exhaust valves from the output values, and thereby controls the engine operation. In this case, too, by reducing the level of valve lift of the exhaust valve 19b and reducing the area of the exhaust opening, the ECU 1 can secure the amount of heat necessary for ignition through control of the amount of internal EGR.

As explained above, the embodiment can also secure the amount of internal EGR and determine appropriate ignition timing using the variable valve mechanisms 15a and 15b and further correct the amount of intake air using the throttle valve 7, and can thereby perform an engine operation best suited to the required torque. Thus, the embodiment can expand the compression ignition combustion operating area.

Then, a ninth method of controlling the compression ignition combustion mode of the compression ignition internal combustion engine according to the first embodiment of the present invention will be explained by using FIG. 14.

Figure 14:
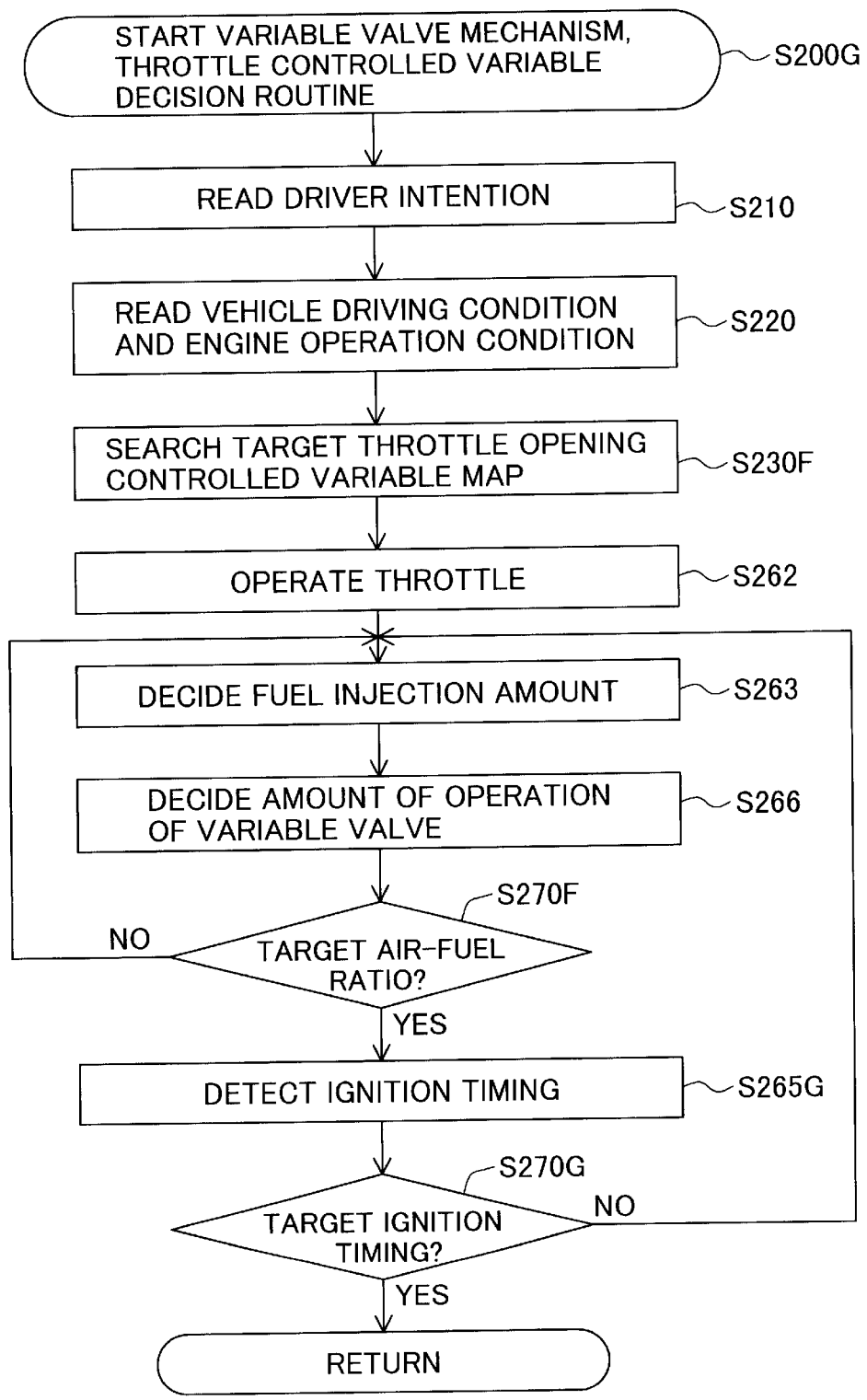
FIG. 14 is a flow chart showing the contents of control of a ninth method of controlling the compression ignition combustion mode of the compression ignition internal combustion engine according to the first embodiment of the present invention.

FIG. 14 is a flow chart showing the contents of control of the ninth method of controlling the compression ignition combustion mode of the compression ignition internal combustion engine according to the first embodiment of the present invention. The steps with the same reference numerals as those in FIG. 3 to FIG. 13 show the same contents of control.

In the embodiment, the controlled variable of the throttle valve opening with respect to the required output torque of the engine is written in the ECU 1 beforehand to control the opening of the throttle valve. The configuration of the compression ignition internal combustion engine according to the embodiment is the same as that shown in FIG. 6.

The embodiment adds control in steps s265G and s270G to the eighth control method shown in FIG. 13. The contents of control in steps s265G and s270G are equivalent to those in steps s265 and s270A in FIG. 7.

In step s200G, the ECU 1 starts a variable valve mechanism, throttle valve controlled variable decision routine in the compression ignition combustion mode with the ninth control content.

The contents of control in steps s210 to s270F are the same as those explained in FIG. 13.

In step s265G, the ECU 1 detects ignition timing from the output value of the pressure sensor 27. The method of detecting ignition timing is the same as that explained in FIG. 8.

In step s270G, the ECU 1 compares the target ignition timing with the actual ignition timing and controls the amount of fuel injection and the variable valve mechanisms 15a and 15b of the intake/exhaust valves so that the actual ignition timing coincides with the target ignition timing. Here, the target ignition timing is preset in the ECU 1 as a value commensurate with the operating condition. The ignition timing during operation can also be detected by detecting an ion current using the both ends of the discharge section of the ignition plug 13 as the electrodes and the ignition timing based on the output value thereof.

As described above, the embodiment also allows the variable valve mechanisms 15a and 15b to secure the amount of internal EGR and set appropriate the ignition timing and further allows the throttle valve 7 to correct the amount of intake air, and can thereby perform optimum engine operation operating area.

As described above, the control methods of the first embodiment of the present invention can control various parameters such as the setting of ignition timings, the amount of internal EGR (temperature inside the combustion chamber 16) and the amount of intake air independently through control of the throttle valve 7 and the variable valve mechanisms 15a and 15b of the intake valve 19a and the exhaust valves 19b, and can thereby continue optimum engine operation with low exhaust, low fuel consumption without producing torque level differences.

Then, with reference now to FIG. 15 to FIG. 23, a configuration and operation of a compression ignition internal combustion engine according to a second embodiment of the present invention will be explained below.

The configuration of the compression ignition internal combustion engine according to the embodiment is the same as that shown in FIG. 6. The embodiment changes control over the throttle valve and the variable valve mechanisms according to the operating condition of the engine in the compression ignition combustion mode.

First, the method of controlling the compression ignition combustion mode of the compression ignition internal combustion engine according to the embodiment in a low-speed, low-load state will be explained by using FIG. 15 to FIG. 17.

Figure 15:
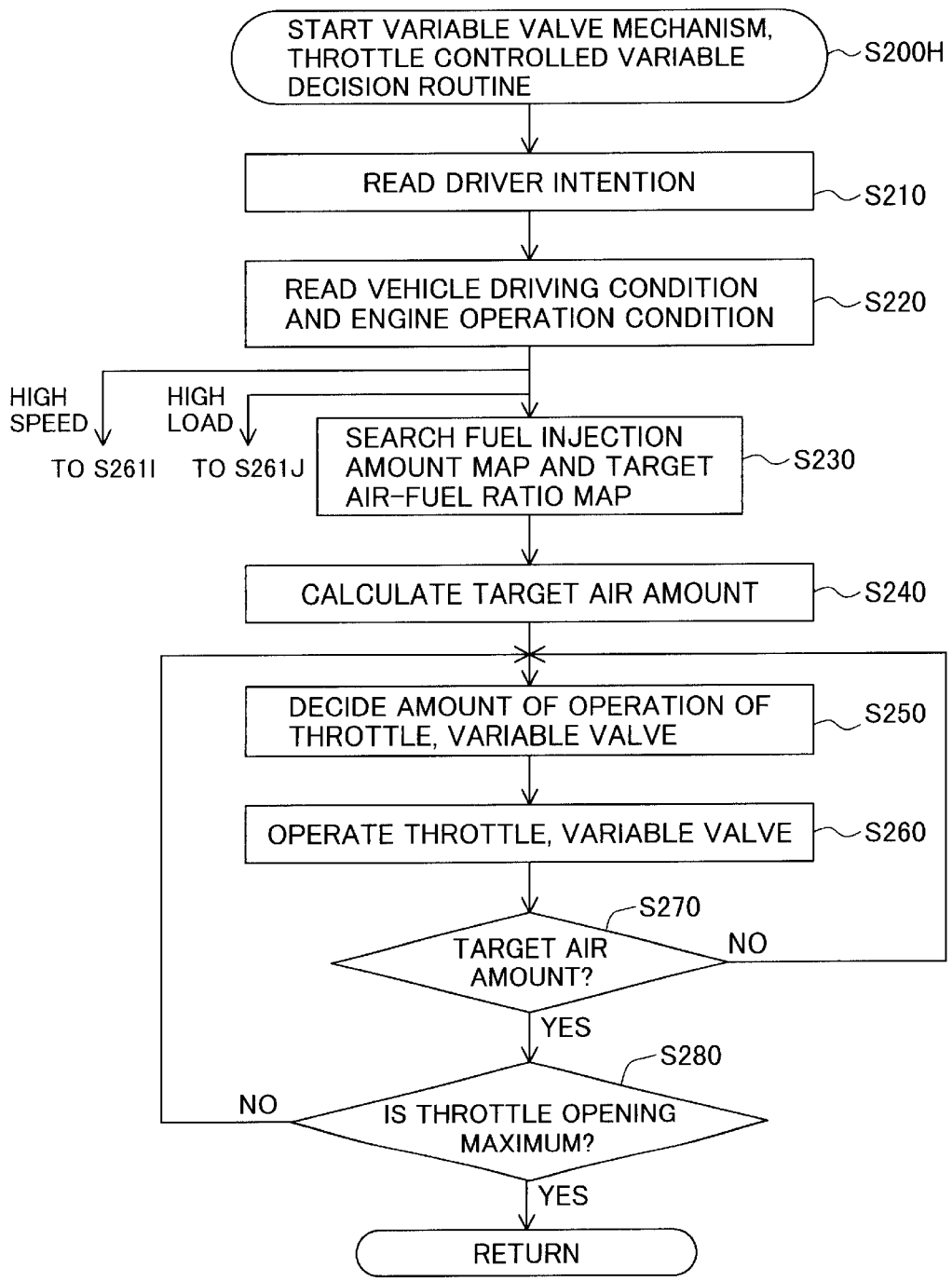
FIG. 15 is a flow chart showing the contents of control in a compression ignition combustion mode in a low-speed, low-load state of a compression ignition internal combustion engine according to a second embodiment of the present invention.

FIG. 15 is a flow chart showing the contents of control in the compression ignition combustion mode in a low-speed, low-load state of the compression ignition internal combustion engine according to the second embodiment of the present invention. Furthermore, FIG. 16 illustrates controlled variable of the variable valves in a compression ignition combustion mode in a low-speed, low-load state of the compression ignition internal combustion engine according to the second embodiment of the present invention and FIG. 17 illustrates a state of the engine in the compression ignition combustion mode in a low-speed, low-load state of the compression ignition internal combustion engine according to the second embodiment of the present invention. In FIG. 17, the same reference numerals as those in FIG. 6 denote the same parts.

In step s200H, the ECU 1 starts a variable valve mechanism, throttle valve controlled variable decision routine in the compression ignition combustion mode in a low-speed, low-load state.

First, in step s210 the ECU 1 reads output values of the accelerator opening detection device 2a and brake depressing force detection device 2b as the intention of the driver.

Then, in step s220, the ECU 1 takes in an output value of the vehicle speed detection device 2c as the vehicle driving condition and takes in output values of the accelerator opening detection device 2a, the air-fuel ratio sensor 22, the crank angle sensor 4, the air flow sensor 5 and the intake air temperature sensor mounted on the air flow sensor 5, the engine cooling water temperature sensor 24 and the post-catalyst exhaust temperature sensor 23 as the engine e operating conditions. The process moves on to step s230 when the engine operating conditions are set to a low-speed, low-load state, while the process moves on to step s261I in FIG. 18 when the engine operating conditions a re set to a high-speed, low-load state and the process moves on to step s261J in FIG. 21 when the engine operating conditions are set to a low-speed, high-load state.

In the case of a low-speed, low-load state, in step s230, the ECU 1 decides the output torque based on the output values read in step s210 and s220, searches for the fuel injection amount map and the target air-fuel ratio map stored in the ECU 1 beforehand and selects the amount of fuel injection and the target air-fuel ratio.

Then, in step s240, the ECU 1 decides the target air amount based on the amount of fuel injection and target air-fuel ratio selected in step s230.

Then, in step s250, the ECU 1 decides amounts of operation of the throttle valve 7 and the variable valve mechanisms 15a And 15b of the intake/exhaust valves according to the output value of the air flow sensor 5, the output value of the intake air temperature sensor in the air flow sensor 5 and the output value of the crank angle sensor 4. Since it is known that the compression ignition timing of the air-fuel mixture in the combustion chamber 16 depends on the temperature history, the pressure history and the air-fuel ratio of the air-fuel mixture of the combustion chamber 16, it is possible to determine the amounts of operation of the variable valve mechanisms 15a and 15b of the intake valve and exhaust the valve and the intake air regulating device 7. That is, the closing timing of the intake valve 19a for realizing an optimum ignition timing is decided according to the decided intake air, the amount of internal EGR and air-fuel ratio.

Then, in step s260, the ECU 1 operates the throttle valve 7 and the variable valve mechanisms 15a and 15b of the intake/exhaust valves based on the amounts of operation decided in step s250.

Here, the method of controlling the intake/exhaust valves in the compression ignition combustion mode of the compression ignition internal combustion engine according to the embodiment will be explained by using FIG. 16 and FIG. 17.

Figure 17:
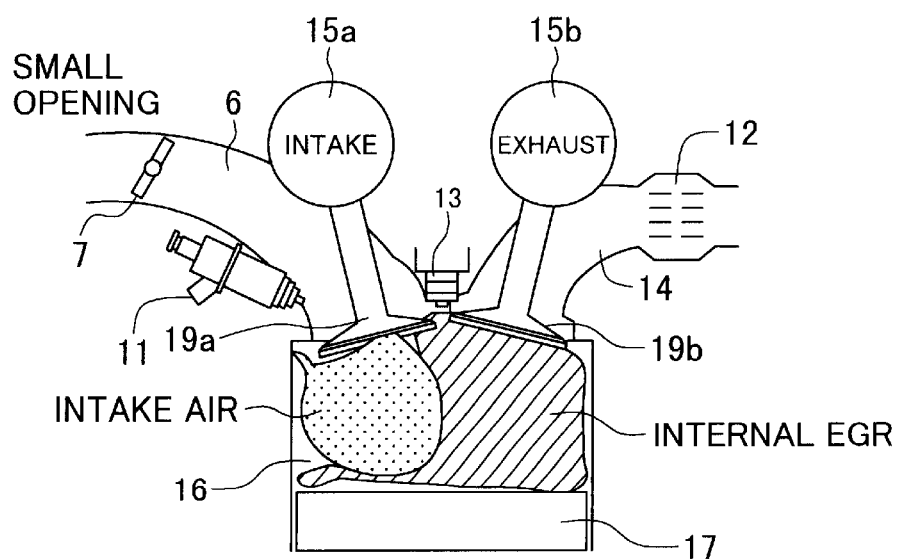
FIG. 17 illustrates the state of the engine in the compression ignition combustion mode in a low-speed, low-load state of the compression ignition internal combustion engine according to the second embodiment of the present invention.

As shown in FIG. 17, the opening of the throttle valve 7 is set to be relatively small. This is because the filling efficiency needs to be set to a small value since the compression ignition internal combustion engine is in a low-load, low-speed area.

Figure 16:
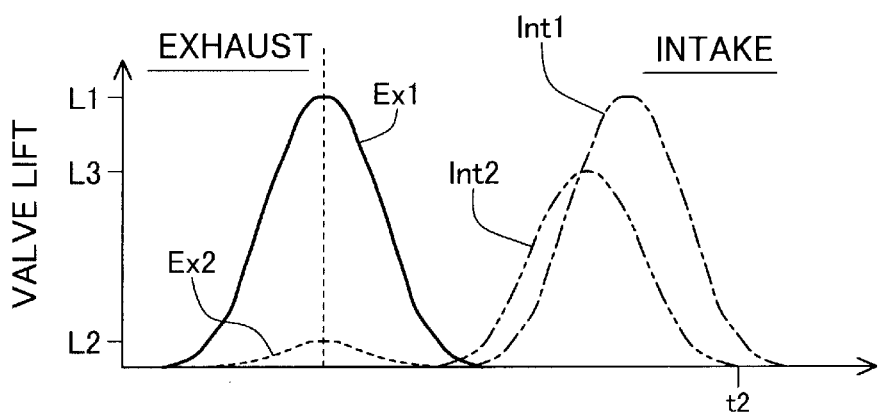
FIG. 16 illustrates controlled variable of the variable valves in the compression ignition combustion mode in a low-speed, low-load state of the compression ignition internal combustion engine according to the second embodiment of the present invention.

In FIG. 16, the horizontal axis shows a crank angle and the vertical axis shows valve lifts of the intake valve and the exhaust valve.

The lift level of the exhaust valve during the spark ignition combustion is as shown with solid line Ex1 in the drawing and suppose the maximum value of the level of valve lift is L1. On the other hand, the lift level of the intake valve is as shown with single-dot dashed line Int1 and suppose the maximum value of the level of valve lift is L1.

On the other hand, the lift level of the intake valve 19a during the compression ignition combustion under a low-speed, low-load operating condition is as shown with 2-dot dashed line Int2 in the drawing, the closing timing of the intake valve 19a (time t2) is relatively early, and the lift level of the intake valve 19a is set to L3, a value relatively small. The level of valve lift of the exhaust valve 19b is as shown with dotted line Ex2 in the drawing and suppose the maximum value of the level of the valve lift is controlled by the variable valve mechanism 15b to L2, a value smaller than that during the spark ignition combustion. Making the level of valve lift of the exhaust valve 19b during the compression ignition combustion lower than that during a spark ignition combustion gives an effect of reducing the amount of the exhaust gas and controlling the internal EGR, while further reducing the level of valve lift of the exhaust valve 19b in the case of a low-speed, low-load state decreases the filling efficiency of the intake air and secures more internal EGR. When, for example, cam type variable valve mechanisms are used, controlling the valve lifts to a small value can reduce friction loss due to a cam drive force phenomenon, and thereby reduce fuel consumption drastically and expand the compression ignition combustion operating area toward the high-load side.

Next, in step s270, the ECU 1 compares the output value of the air flow sensor 5 with the amount of air decided by the target air-fuel ratio and controls feedback of the throttle valve 7 and the variable valve mechanisms 15a and 15b so that the two values match. At this time, the closing timing of the intake valve 19a has been decided in step s250 and subsequent control of the amount of intake air is performed using valve lifts of the intake valve 19a or the throttle valve 7.

Then, in step s280, the ECU 1 decides whether an operating condition that satisfies the required torque exists or not by controlling the variable valve mechanisms 15a and 15b and the amount of fuel injection even if the opening of the throttle valve 7 is relatively large in a low-load, low-speed area and if such an operating condition exists, the ECU 1 selects a combination with the maximum opening of the throttle valve 7, that is, the best fuel efficiency, while keeping the internal EGR rate constant inside the combustion chamber 16 of the engine.

Then, the method of controlling the compression ignition combustion mode in a high-speed, low-load state of the compression ignition internal combustion engine according to the embodiment will be explained by using FIG. 18 to FIG. 20.

Figure 18:
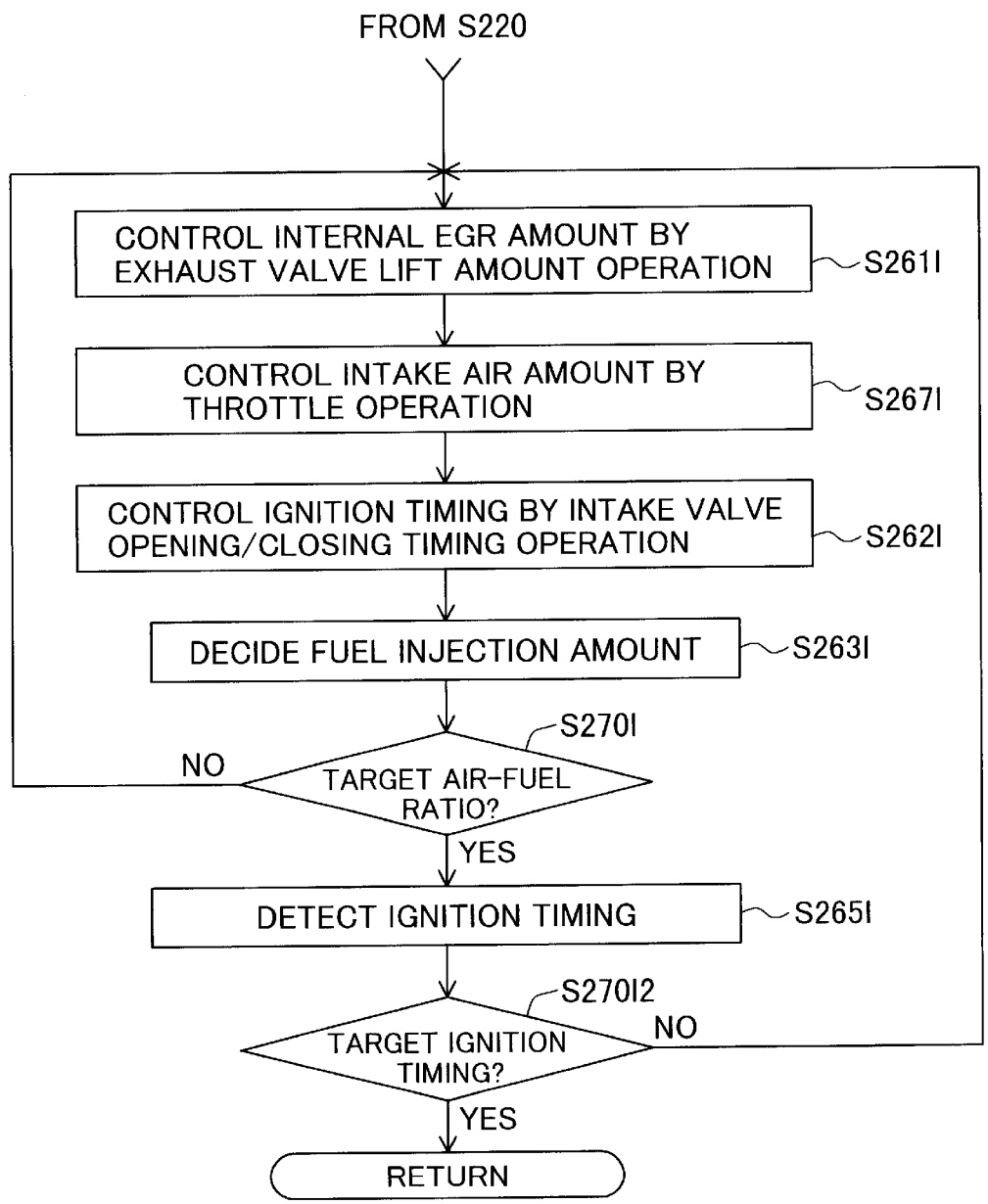
FIG. 18 is a flow chart showing the contents of control in the compression ignition combustion mode in a high-speed, low-load state of the compression ignition internal combustion engine according to the second embodiment of the present invention.

FIG. 18 is a flow chart showing the contents of control in the compression ignition combustion mode in a high-speed, low-load state of the compression ignition internal combustion engine according to the second embodiment of the present invention. Furthermore, FIG. 19 illustrates controlled variables of the variable valves in the compression ignition combustion mode in a high-speed, low-load state of the compression ignition internal combustion engine according to the second embodiment of the present invention and FIG. 20 illustrates a state of the engine in the compression ignition combustion mode in a high-speed, low-load state of the compression ignition internal combustion engine according to the second embodiment of the present invention. By the way, in FIG. 19, the same reference numerals as those in FIG. 16 denote the same parts. In FIG. 20, the same reference numerals as those in FIG. 6 denote the same parts.

In step s220 in FIG. 15, when the engine speed increases and a high-speed, low-load state is created under an engine operating condition, the process moves on to step s261I in FIG. 18.

When the engine speed increases, a one-cycle elapsed time is shortened, which in turn shortens the high-temperature residence time of the air-fuel mixture, and therefore realizing compression ignition requires the compression ratio to be increased to increase an ultimate temperature inside the combustion chamber 16 or the internal temperature of the combustion chamber 16 at the beginning of compression to be set to a high value. At the same time, kinetic energy of the intake air increases, and therefore a pulsation flow inside the intake port 6 changes and the valve closing timing of the intake valve 19a at which the filling efficiency reaches a maximum shifts toward the phase lag side.

Thus, in step s261I, the ECU 1 manipulates the level of lift of the exhaust valve 19b using the variable valve mechanism 15b so that the area of the exhaust opening increases as the engine speed increases.

Figure 19:
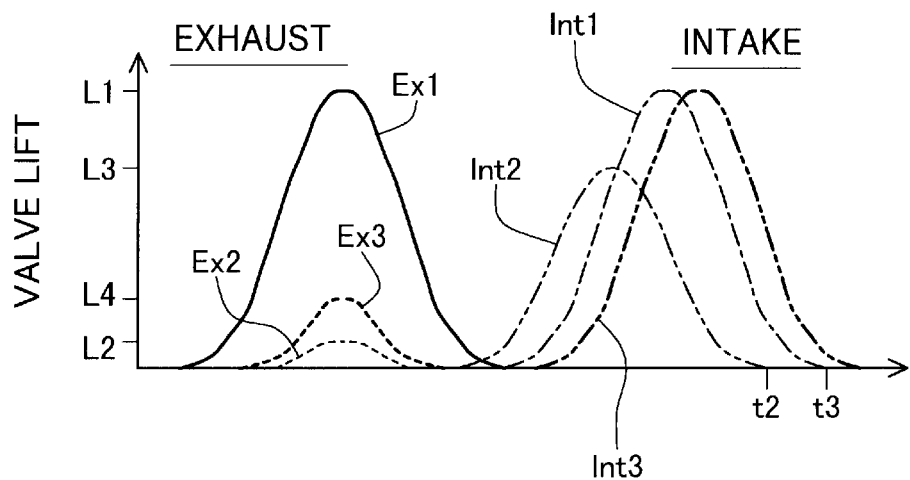
FIG. 19 illustrates controlled variables of the variable valves in the compression ignition combustion mode in a high-speed, low-load state of the compression ignition internal combustion engine according to the second embodiment of the present invention.
Figure 20:
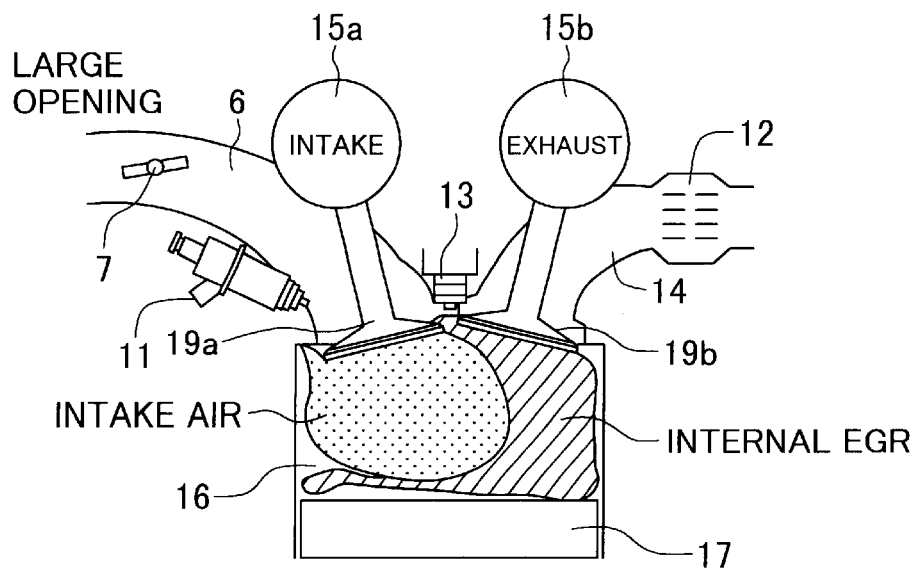
FIG. 20 illustrates the state of the engine in the compression ignition combustion mode in a high-speed, low-load state of the compression ignition internal combustion engine according to the second embodiment of the present invention.

That is, as shown in FIG. 19, the lift level of the exhaust valve 19b during a compression ignition combustion under a high-speed, low-load operating condition is as shown with dotted line Ex3 in the drawing and the lift level of the exhaust valve 19b is assumed to be L4, which is greater than the lift level L2 of the exhaust valve 19b under a low-speed, low-load operating condition.

Then, in step s267I, the ECU 1 increases the opening of the throttle valve 7 to control the amount of intake air so that the air-fuel ratio of the mixture approaches a theoretical air-fuel ratio with respect to an amount of fuel injection preset under the engine operating condition. This is because bringing the air-fuel ratio of the mixture closer to the theoretical air-fuel ratio increases the combustion gas temperature and increases the amount of intake air, and thereby decreases the internal EGR rate, thus preventing an incidental decrease in the temperature inside the combustion chamber 16 necessary for a compression ignition combustion at the beginning of compression.

Then, in step s262I, the ECU 1 controls the variable valve mechanism 15a on the intake side so as to select appropriate ignition timing. During a compression ignition combustion under a high-speed, low-load operating condition, the level of valve lift of the intake valve 19a is as shown with 2-dot dashed line Int3 in the drawing and the closing timing (time t3) of the intake valve 19a is later than the closing timing (time t2) in a low-speed, low-load state and the level of valve lift of the intake valve 19a is set to L1, which is greater than the level of lift L3 in a low-speed, low-load state.

Then, in step s263I, the ECU 1 decides the amount of fuel injection according to the amount of intake air controlled in step s267I and the target air-fuel ratio preset in the ECU 1 and injects fuel using the fuel injection valve 11.

Then, in step s270I, the ECU 1 reads the air-fuel ratio of the combustion gas using the air-fuel ratio sensor 22 and feeds back the amount of new fuel injection and the amounts of operation of throttle valve 7 and the variable valve mechanisms 15a and 15b of the intake/exhaust valves based on the output values thereof, and thereby controls engine operation.

Then, in step s265I, the ECU 1 detects ignition timing based on the output value of the pressure sensor 27. Then, in step s270I2, the ECU 1 compares the target ignition timing with the,actual ignition timing and controls the throttle valve 7 and the variable valve mechanisms 15a and 15b of the intake/exhaust valves so that the actual ignition timing coincides with the target ignition timing. Here, the target ignition timing is preset in the ECU 1 as a value commensurate with the operating condition.

At this time, to prevent vibration, etc. in the engine, it is necessary to control the output value of the air flow sensor 5 to a constant value so that the amount of intake air does not change discontinuously during an operation of the variable valve mechanisms 15a and 15b. This is because the amount of intake air or air-fuel ratio changes drastically depending on time response of the variable valve mechanisms 15a and 15b, causing the operator to have uncomfortable feeling or cause deterioration of exhaust due to accidental fire. That is, to keep normal operation of the engine against variations in the engine speed, it is necessary to perform concerted control between the throttle valve 7 and variable valve mechanisms 15a and 15b as described above.

Then, the method of controlling the compression ignition combustion mode under a low-speed, high-load operating condition of the compression ignition internal combustion engine according to the embodiment will be explained by using FIG. 21 to FIG. 23.

Figure 21:
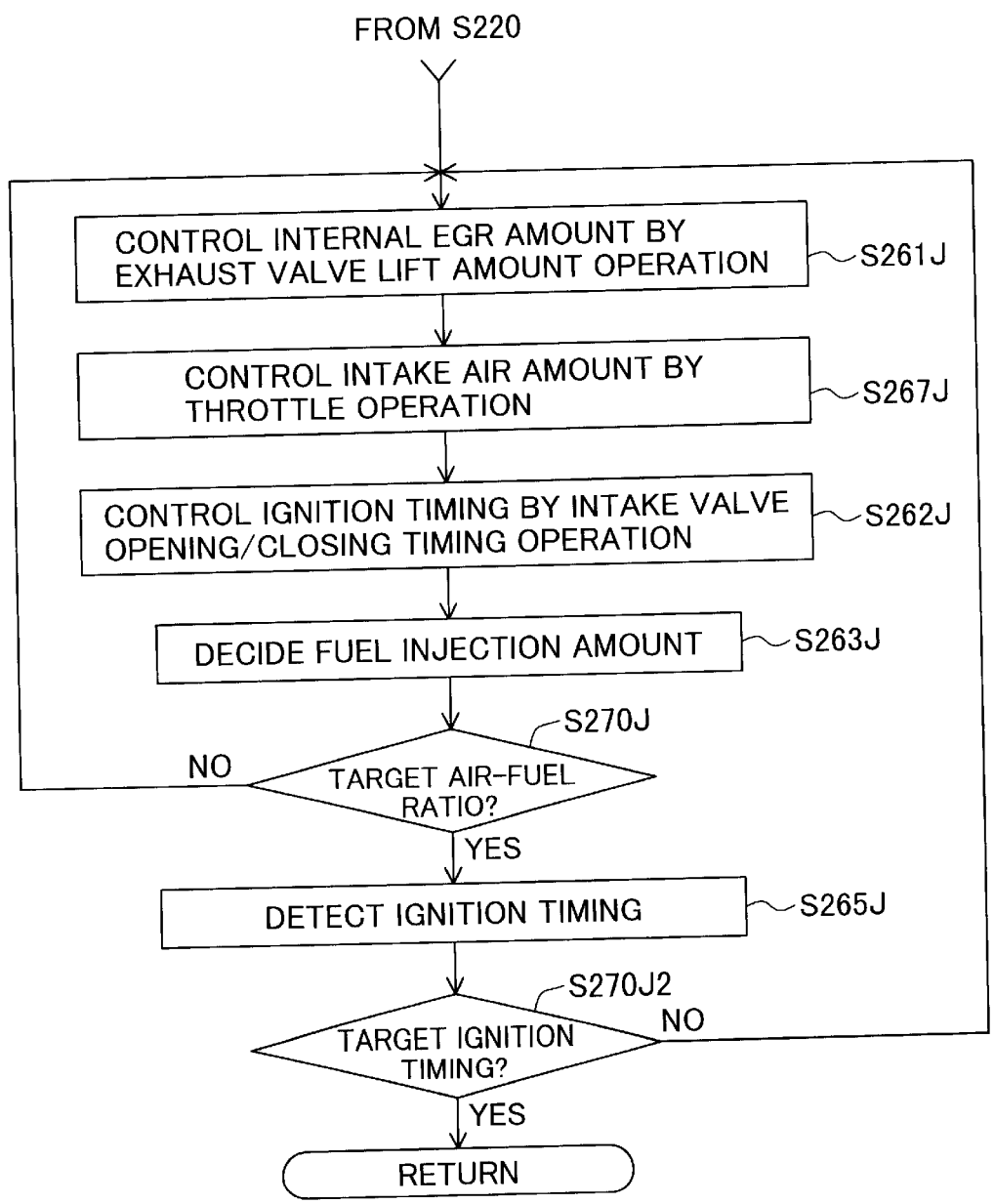
FIG. 21 is a flow chart showing the contents of control in the compression ignition combustion mode in a low-speed, high-load state of the compression ignition internal combustion engine according to the second embodiment of the present invention.

FIG. 21 is a flow chart showing the contents of control in the compression ignition combustion mode in a low-speed, high-load state of the compression ignition internal combustion engine according to the second embodiment of the present invention. Furthermore, FIG. 22 illustrates controlled variables of the variable valves in the compression ignition combustion mode in a low-speed, high-load state of the compression ignition internal combustion engine according to the second embodiment of the present invention. FIG. 23 illustrates the state of the engine in the compression ignition combustion mode in a low-speed, high-load state of the compression ignition internal combustion engine according to the second embodiment of the present invention. By the way, in FIG. 22, the same reference numerals as those in FIG. 16 denote the same parts. In FIG. 23, the same reference numerals as those in FIG. 6 denote the same parts.

In step s220 in FIG. 15, when the engine load increases and a high-speed, low-load state is created under an engine operating condition, the process moves on to step s261J in FIG. 21. When the load increases, required torque also increases and therefore the efficiency of filling the engine needs to be increased.

Thus, in step s261J, the ECU 1 manipulates lifts of the exhaust valve 19b using the variable valve mechanism 15b so that the area of the exhaust opening increases as the load increases.

Figure 22:
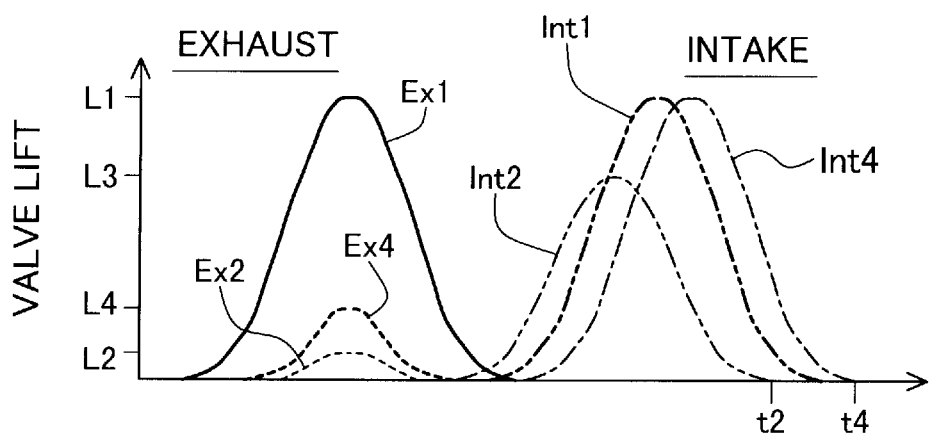
FIG. 22 illustrates controlled variables of the variable valves in the compression ignition combustion mode in a low-speed, high-load state of the compression ignition internal combustion engine according to the second embodiment of the present invention.
Figure 23:
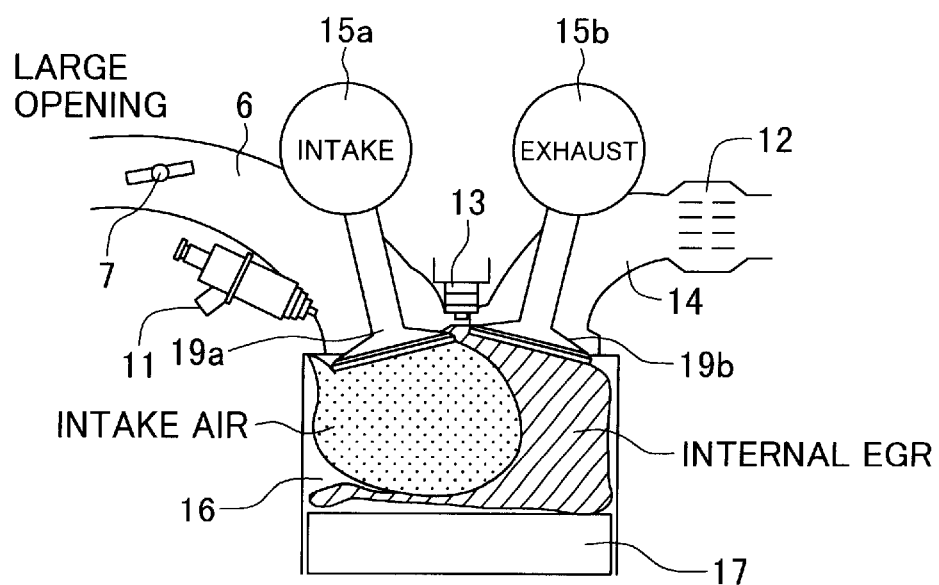
FIG. 23 illustrates the state of the engine in the compression ignition combustion mode in a low-speed, high-load state of the compression ignition internal combustion engine according to the second embodiment of the present invention.

That is, as shown in FIG. 22, the level of valve lift of the exhaust valve 19b during a compression ignition combustion under a low-speed, high-load operating condition is as shown with dotted line Ex4 in the drawing and the lift level of the exhaust valve 19b is assumed to be L4, which is greater than the lift level L2 of the exhaust valve 19b under a low-speed, low-load operating condition.

Then, in step s267J, the ECU 1 increases the opening of the throttle valve 7 to control the amount of intake air so that the air-fuel ratio of the mixture approaches a theoretical air-fuel ratio with respect to an amount of fuel injection preset under the engine operating condition. This is because bringing the air-fuel ratio of the mixture closer to the theoretical air-fuel ratio increases the combustion gas temperature and increases the amount of intake air, which decreases the internal EGR rate, thus preventing an incidental decrease in the temperature inside the combustion chamber 16 necessary for a compression ignition combustion at the beginning of compression.

Then, in step s262J, the ECU 1 controls the variable valve mechanism 15a on the intake side so as to select appropriate ignition timing. During a compression ignition combustion under a low-speed, high-load operating condition, the level of valve lift of the intake valve 19a is as shown with 2-dot dashed line Int4 in the drawing and the closing timing (time t4) of the intake valve 19a is later than the closing timing, (time t2) in a low-speed, low-load state and the level of lift of the intake valve 19a is set to L1, which is greater than the level of lift L3 in a low-speed, low-load state.

Then, in step s263J, the ECU 1 decides the amount of fuel injection according to the amount of intake air controlled in step s267J and the target air-fuel ratio preset in the ECU 1 and injects fuel using the fuel injection valve 11.

Then, in step s270J, the ECU 1 reads the air-fuel ratio of the combustion gas using the air-fuel ratio sensor 22 and feeds back the amount of new fuel injection and the amounts of operation of throttle valve 7 and the variable valve mechanisms 15a and 15b of the intake/exhaust valves based on the output values thereof, and thereby controls engine operation.

Then, in step s265J, the ECU 1 detects ignition timing based on the output value of the pressure sensor 27. Then, in step s270J2, the ECU 1 compares the target ignition timing with the actual ignition timing and controls the throttle valve 7 and the variable valve mechanisms 15a and 15b of the intake/exhaust valves so that the actual ignition timing coincides with the target ignition timing. Here, the target ignition timing is preset in the ECU 1 as a value commensurate with the operating condition.

At this time, to prevent vibration, etc. in the engine, it is necessary to control the output value of the air flow sensor 5 to a constant value so that the amount of intake air does not change discontinuously during operation of the throttle valve 7 and the variable valve mechanisms 15a and 15b. This is because the amount of intake air or air-fuel ratio changes drastically depending on time response of the variable valve mechanisms 15a and 15b, causing the operator to have uncomfortable feeling or cause deterioration of exhaust due to accidental fire. That is, to keep normal operation of the engine against variations in the engine speed, it is necessary to perform concerted control between the throttle valve 7 and variable valve mechanisms 15a and 15b as described above.

As explained above, the embodiment can secure the amount of internal EGR and determine appropriate ignition timing using the variable valve mechanisms 15a and 15b and further correct the amount of intake air using the throttle valve 7, and can thereby perform an optimum engine operation according to the engine load and engine speed. Thus, the embodiment can expand the compression ignition combustion operating area.

Then, with reference now to FIG. 24 to FIG. 27, a configuration and operation of a compression ignition internal combustion engine according to a third embodiment of the present invention will be explained below.

The configuration of the compression ignition internal combustion engine according to the embodiment is the same as that shown in FIG. 6. The embodiment switches between a compression ignition combustion mode and a spark ignition combustion mode according to the engine speed and engine load.

Figure 24:
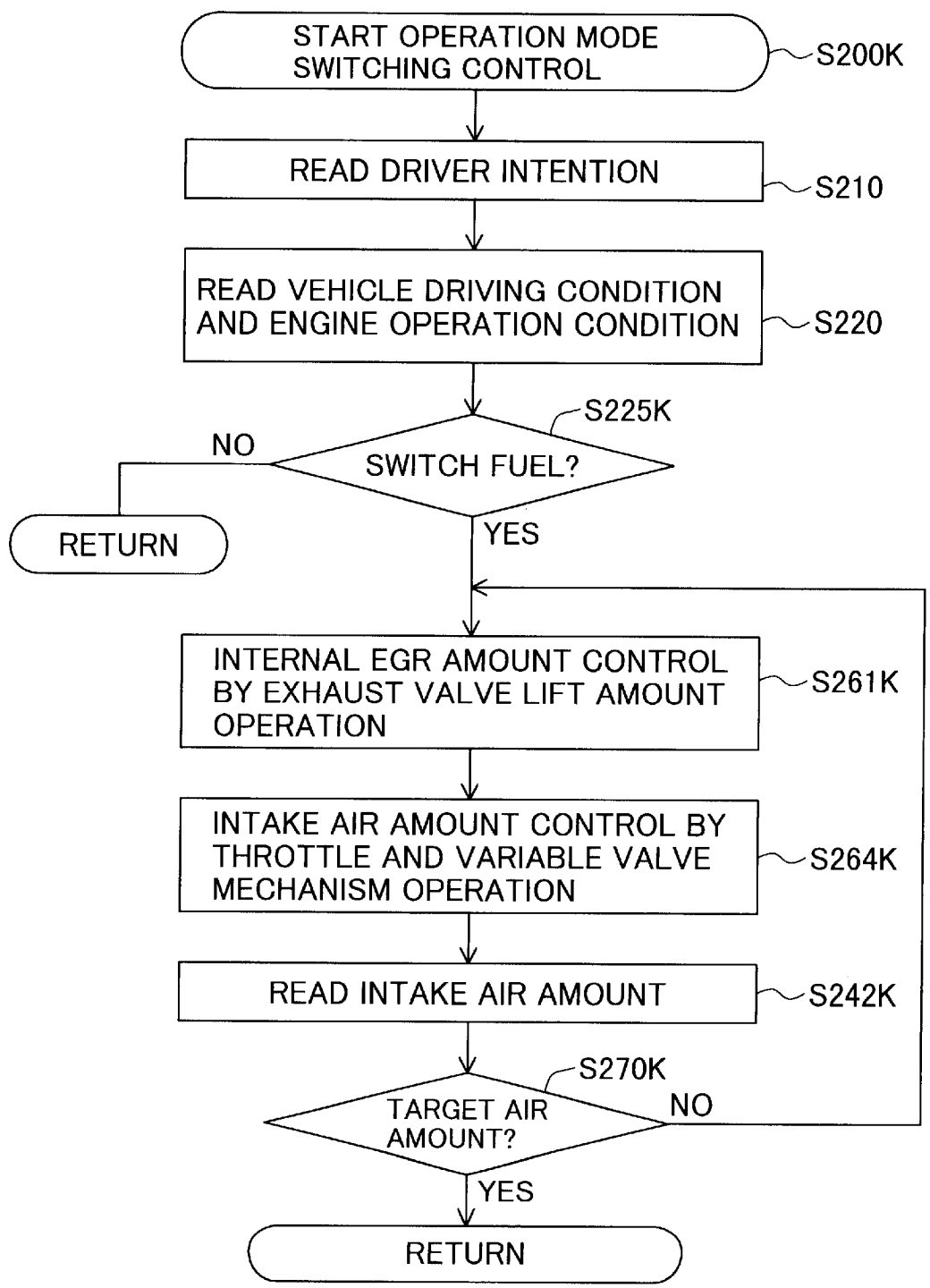
FIG. 24 is a flow chart showing the contents of control of switching between a compression ignition combustion mode and spark ignition combustion mode of a compression ignition internal combustion engine according to a third embodiment of the present invention.

FIG. 24 is a flow chart showing the contents of control of switching between a compression ignition combustion mode and a spark ignition combustion mode of a compression ignition internal combustion engine according to a third embodiment of the present invention. Furthermore, FIG. 25 and FIG. 26 illustrate control of switching between a compression ignition combustion mode and a spark ignition combustion mode of the compression ignition internal combustion engine according to the third embodiment of the present invention.

In step s200K, the ECU 1 starts operation mode switching control.

First, in step s210, the ECU 1 reads output values of the accelerator opening detection device 2a and the brake depressing force detection device 2b as the intention of the driver.

Then, in step s220, the ECU 1 takes in an output value of the vehicle speed detection device 2c as the vehicle driving condition and takes in output values of the accelerator opening detection device 2a, the air-fuel ratio sensor 22, the crank angle sensor 4, the air flow sensor 5 and the intake air temperature sensor mounted on the air flow sensor 5, the engine cooling water temperature sensor 24 and the post-catalyst exhaust temperature sensor 23 as the engine operating condition s.

Next, in step s225K, the ECU 1 decides whether it is necessary to change the combustion state or not. If a change is necessary, the process moves on to step s261K.

Here, a relationship between the engine condition and the operation mode will be explained by using FIG. 25.

In FIG. 25, the horizontal axis shows an engine speed and the vertical axis shows engine load. The compression ignition combustion area and spark ignition combustion area are predetermined by the engine speed and engine load, and these are stored in the ECU 1. In the illustrated example, an area under a low-load, low-speed condition which corresponds to an idle rotation area corresponds to the spark ignition combustion area and a high-load area also corresponds to the spark ignition combustion area. Other low-load areas correspond to compression ignition combustion operating areas.

For example, under an engine operating condition A with an engine speed of Ra and engine load of La, a spark ignition combustion is selected, while under an engine operating condition B with an engine speed of Rb and engine load of Lb, a compression ignition combustion is selected. For example, the engine operating condition A corresponds to a condition of driving on a flat ground and the engine operating condition B corresponds to a condition of driving on an ascending slope. Therefore, when the driving condition changes from a flat ground driving condition to an ascending slope driving condition, it is necessary to switch the operation mode from a compression ignition combustion mode to a spark ignition combustion mode.

When a combustion state needs to be changed, in step s261K, the ECU 1 controls the amount of internal EGR through manipulation of the lift level of the exhaust valve. The internal EGR rate in the combustion chamber 16 differs drastically between a compression ignition combustion period and a spark ignition combustion period. For example, when a compression ignition combustion is switched to a spark ignition combustion between the condition A and condition B, the amount of internal EGR must be reduced drastically.

FIG. 26A illustrates an amount of air intake, FIG. 26B illustrates an area of exhaust opening and FIG. 26C illustrates a change of an internal EGR rate when the engine operating condition changes from a point of condition A of a compression ignition combustion area to a point of condition B of the spark ignition combustion area. As shown in FIG. 26C, when a compression ignition combustion is switched to a spark ignition combustion between the condition A and condition B, the amount of internal EGR is reduced drastically at their switching point O. To reduce the amount of internal EGR, the area of exhaust opening is increased as shown in FIG. 26B. To increase the area of exhaust opening, the amount of trapping of internal EGR is reduced by increasing the level of lift or the level of lift and the valve opening time of the exhaust valve 19b.

Then, in step s264K, the ECU 1 operates the throttle valve 7 and variable valve mechanisms 15a and 15b to control the amount of intake air. Here, if the amount of intake air changes, a torque variation occurs, and therefore as shown in FIG. 26A, the opening of the throttle valve 7 or the variable valve mechanisms 15a and 15b are controlled so that the output value of the air flow sensor 5 does not change discontinuously during switching between the combustion modes.

Next, in step s242K, the ECU 1 reads the amount of intake air from the output value of the air flow sensor 5. Then, in step s270K, the ECU 1 performs feedback control so that the read amount of air reaches the target amount of air.

Here, an air-fuel ratio in the compression ignition combustion mode and spark ignition combustion mode of the compression ignition internal combustion engine according to the third embodiment of the present invention will be explained by using FIG. 27.

Figure 27:
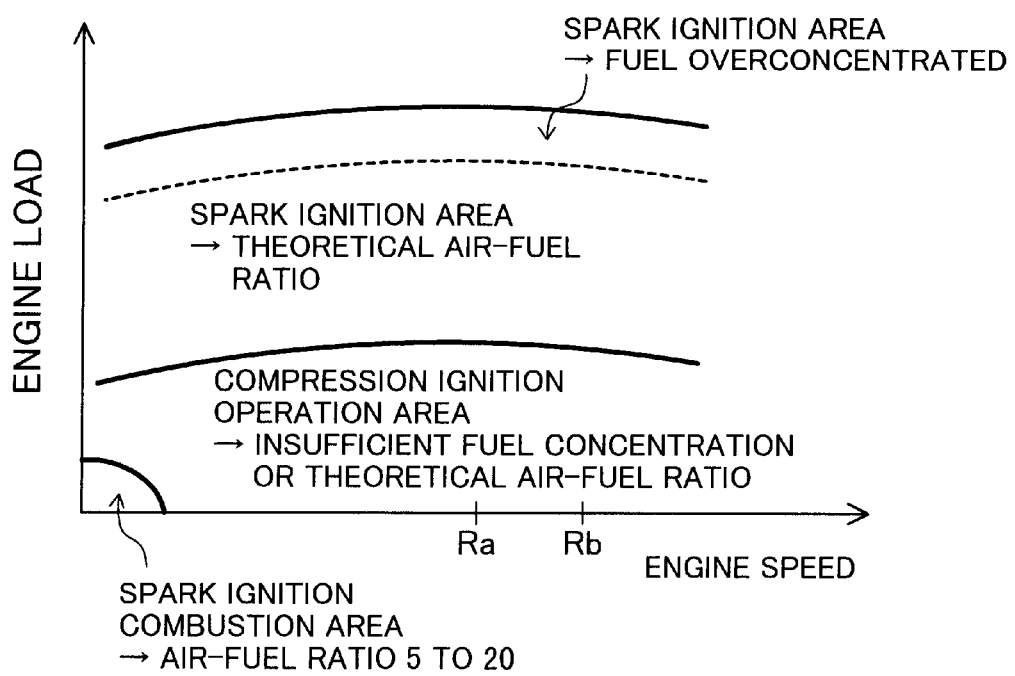
FIG. 27 illustrates an air-fuel ratio in the compression ignition combustion mode and spark ignition combustion mode of the compression ignition internal combustion engine according to the third embodiment of the present invention.

FIG. 27 illustrates an air-fuel ratio in the compression ignition combustion mode and spark ignition combustion mode of the compression ignition internal combustion engine according to the third embodiment of the present invention.

In FIG. 27, the horizontal axis shows an engine speed and the vertical axis shows an engine load. The compression ignition combustion area and the spark ignition combustion area are predetermined by the engine speed and the engine load and stored in the ECU 1. In the illustrated example, an area under a low-load, low-speed condition which corresponds to an idle rotation area corresponds to the spark ignition combustion area and a high-load area also corresponds to the spark ignition combustion area. Other low-load areas correspond to the compression ignition operating areas.

When the spark ignition combustion is selected as the combustion method, the compression ignition internal combustion engine of the embodiment operates at a theoretical air-fuel ratio of the mixture or at an air-fuel ratio with more concentrated fuel. Furthermore, when the compression ignition combustion is selected, it is possible to realize a combustion with ultra-low NOx and ultra-low HC through the aforementioned control. However, the exhaust level after an engine exhaust during the spark ignition combustion is almost no different from the exhaust level during an operation by the spark ignition combustion of the conventional engine and requires a cleanup of exhaust through a catalyst control. Thus, when the engine is operating under a spark ignition combustion, the compression ignition internal combustion engine of the embodiment performs engine operation at a theoretical air-fuel ratio which corresponds to the best catalyst cleaning performance or at an air-fuel ratio with more concentrated fuel, and thereby realizes a reduction of engine emissions in the spark ignition combustion area. The present invention eliminates the need for a complicated catalyst configuration for reducing engine emissions mounted on the conventional engine and can provide a low-cost engine.

As shown above, at the time of switching the operation mode, the embodiment controls the amount of internal EGR using the variable valve mechanisms 15a and 15b and further corrects the amount of intake air through the throttle valve 7 and controls so that the amount of intake air does not change drastically at a switching point 0, and can thereby reduce a torque variation accompanying switching between the operation modes and realize smooth switching between operation modes.

Then, with reference now to FIG. 28, a configuration of a compression ignition internal combustion engine according to a fourth embodiment of the present invention will be explained.

Figure 28:
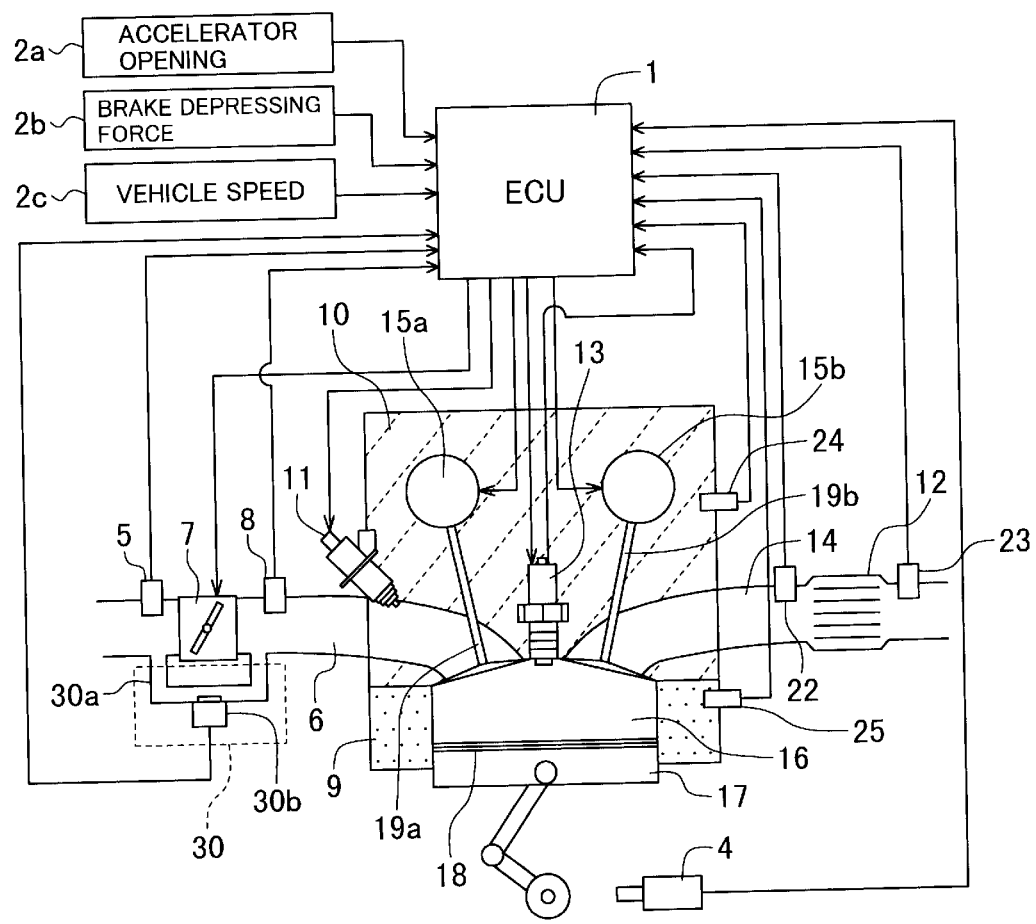
FIG. 28 is a system block diagram showing a configuration of a compression ignition internal combustion engine according to a fourth embodiment of the present invention.

FIG. 28 is a system block diagram showing a configuration of the compression ignition internal combustion engine according to the fourth embodiment of the present invention. The same reference numerals as those in FIG. 1 denote the same parts.

The embodiment is also provided with a bypass flow rate control device 30 in addition to the throttle valve 7 shown in FIG. 1 as a intake air regulating device. The bypass flow rate control device 30 consists of a bypass flow channel 30a that connects the upstream and downstream of the throttle valve 7 and a valve 30b provided inside this bypass flow channel 30a. The valve 30b whose opening is controlled by the ECU 1 controls the amount of micro intake air that flows through the bypass flow channel 30a.

As explained in FIG. 15 to FIG. 17, when the engine operates under a relatively low-load, low-speed rotation condition, if the amount of air required for the engine is relatively small, it is possible to accurately control the micro intake air flow rate by closing the throttle valve 7 and controlling the micro air flow rate through the bypass flow rate control device 30.

Even under a low-load, low-speed condition, the embodiment can accurately control the micro air flow rate and accurately control a compression ignition combustion.

Then, a configuration of a compression ignition internal combustion engine according to a fifth embodiment of the present invention will be explained by using FIG. 29.

Figure 29:
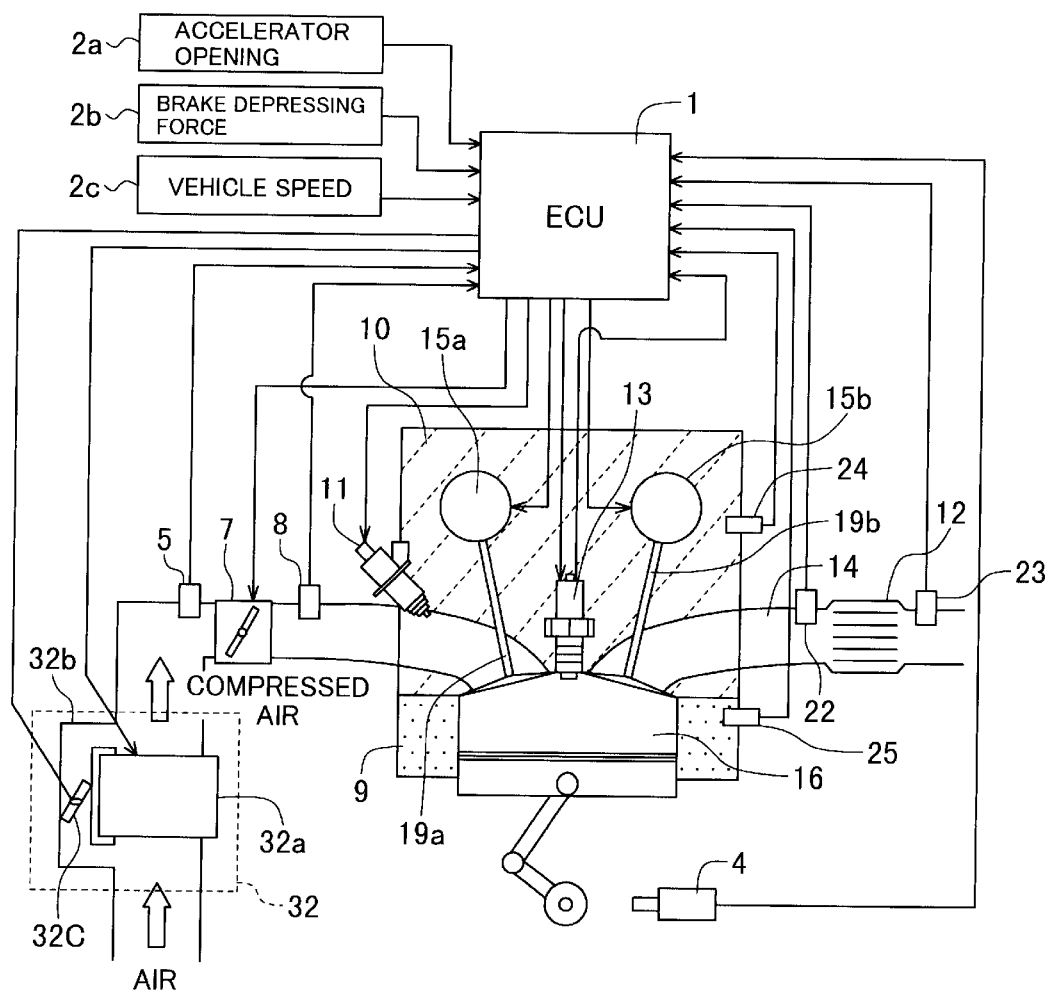
FIG. 29 is a system block diagram showing a configuration of a compression ignition internal combustion engine according to a fifth embodiment of the present invention.

FIG. 29 is a system block diagram showing a configuration of the compression ignition internal combustion engine according to the fifth embodiment of the present invention. The same reference numerals as those in FIG. 1 denote the same parts.

The embodiment is also provided with a supercharging air flow rate control device 32 in addition to the throttle valve 7 shown in FIG. 1 as a intake air regulating device. The supercharging air flow rate control device 32 consists of a supercharger 32a provided on the upstream side of the throttle valve 7, a bypass flow channel 32b that connects the upstream and downstream of this supercharger 32a and a valve 32c provided inside this bypass flow channel 32b. A supercharge of the supercharger 32a is controlled by the ECU 1. The valve 32c whose opening is controlled by the ECU 1 controls the intake air flow rate flowing through the bypass flow channel 32b.

When the engine operates under a high-load, high-speed rotation condition, if the internal EGR is used to control the temperature of the mixture in the combustion chamber 16, the required amount of intake air may be insufficient through only normal control of the throttle valve 7. Thus, the embodiment provides the supercharging air flow rate control device 32 on the upstream side of the throttle valve 7 and allows the ECU 1 to control the flow rate control device 32 according to the intention of the driver, vehicle driving condition and the engine operating condition, and can thereby control the amount of intake air.

A pressure in the combustion chamber at the beginning compression and a compression ignition timing have such a relationship that an ignition timing can be advanced when the pressure in the combustion chamber is high, while the ignition timing is delayed when the pressure in the combustion chamber is low. Thus, the ECU 1 controls the supercharging air flow rate control device 32 and can thereby control the compression ignition timing of the engine.

Even under a high-load, high-speed condition, the embodiment can supply a required amount of air and also control a compression ignition timing as well.

Then, a configuration of a compression ignition internal combustion engine according to a sixth embodiment of the present invention will be explained by using FIG. 30.

Figure 30:
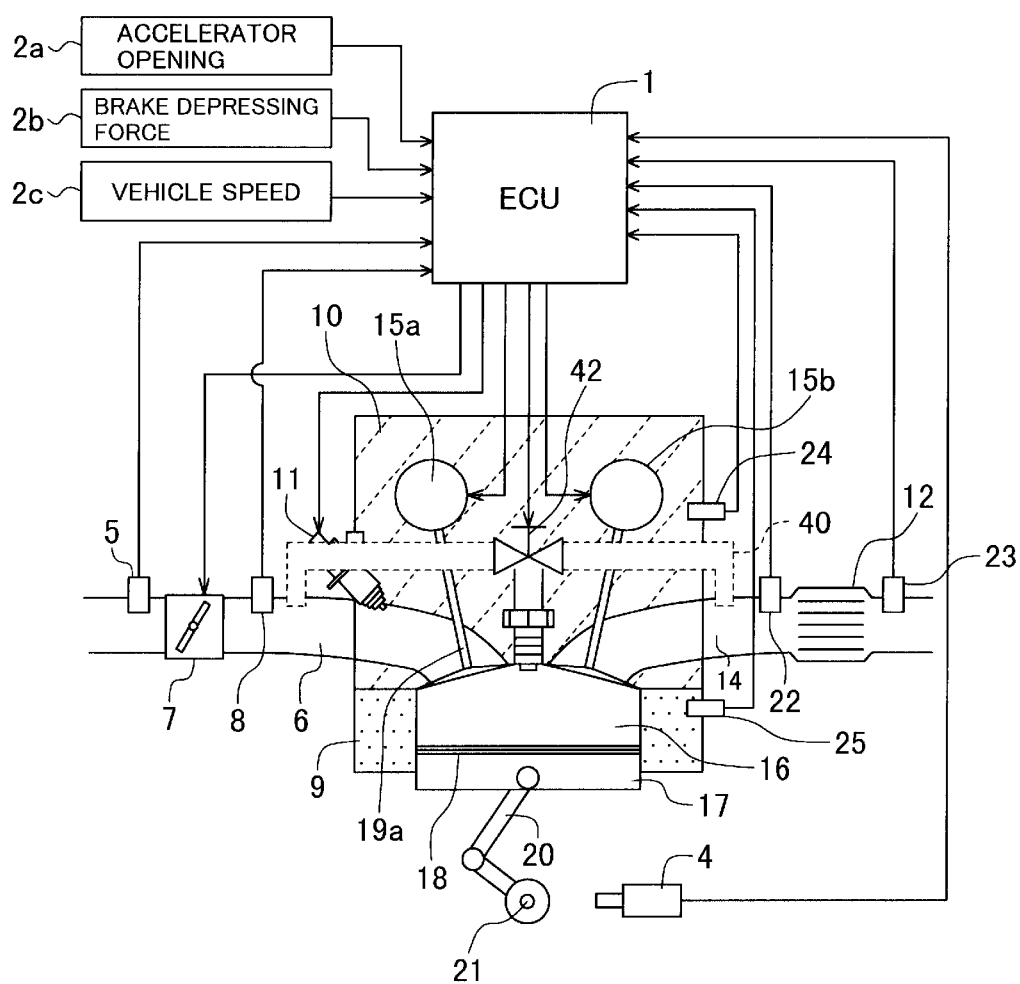
FIG. 30 is a system block diagram showing a configuration of a compression ignition internal combustion engine according to a sixth embodiment of the present invention.

FIG. 30 is a system block diagram showing a configuration of the compression ignition internal combustion engine according to the sixth embodiment of the present invention. The same reference numerals as those in FIG. 1 denote the same parts.

The embodiment is provided with a path 40 and a valve 42 as a intake air regulating device. The path 40 is a bypass for an external EGR provided by connecting the exhaust path 14 and intake path 6 and returns an exhaust gas in the exhaust path 14 to the intake path 6. The valve 42 is controlled by the ECU 1 and controls the flow rate of the returned exhaust gas. That is, provision of the path 40 as the bypass for external EGR combined with the use of the internal EGR allows control of ignition and combustion. The ECU 1 changes the opening of the valve 42 according to the operating condition, vehicle driving condition and intention of the driver and thereby controls the amount of external EGR. External EGR does not hold a heat value as high as that of internal EGR and has highly concentrated inert chemical species that extends the period of combustion such as $CO_2$, and therefore if the ignition timing should be delayed or the combustion period should be extended, it is possible to perform such control that increases the flow rate of external EGR.

The embodiment can control not only the amount of external EGR but also ignition and combustion.

Then, a compression ignition internal combustion engine according to a seventh embodiment of the present invention will be explained by using FIG. 31 to FIG. 33. The system configuration showing a configuration of the compression ignition internal combustion engine according to the embodiment is the same as that shown in FIG. 1. Furthermore, the method of deciding the combustion mode of the compression ignition internal combustion engine according to the embodiment is the same as that in the flow chart shown in FIG. 2.

The embodiment will explain a specific example of the method of deciding a combustion method whether the compression ignition combustion mode or the spark ignition combustion mode in step s160 in FIG. 2. The embodiment selects the compression ignition combustion mode or the spark ignition combustion mode based on the accelerator opening and vehicle acceleration.

Figure 31:
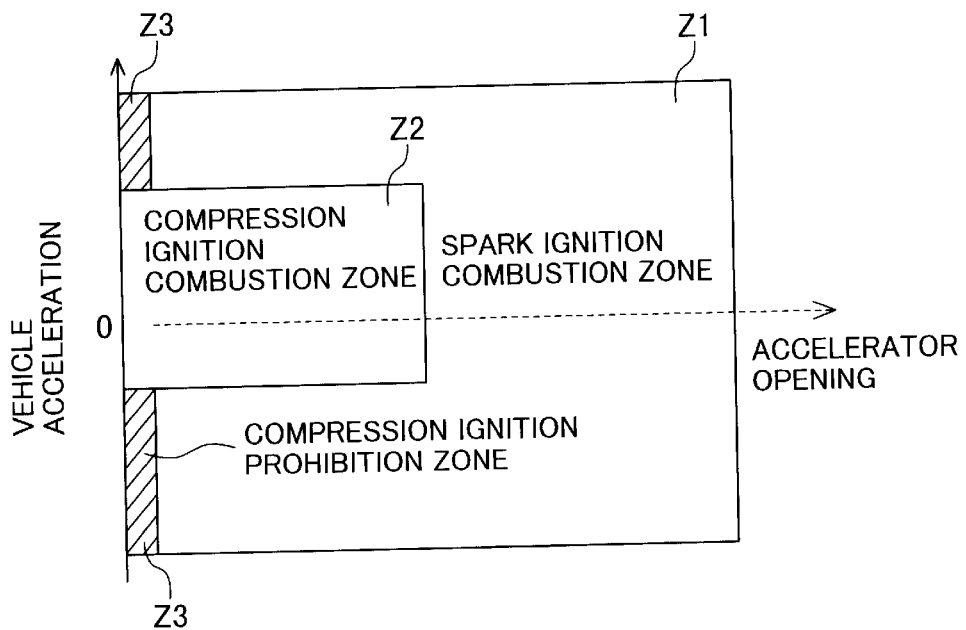
FIG. 31 is an operating area map for deciding a combustion method in a compression ignition internal combustion engine according to a seventh embodiment of the present invention.
Figure 32:
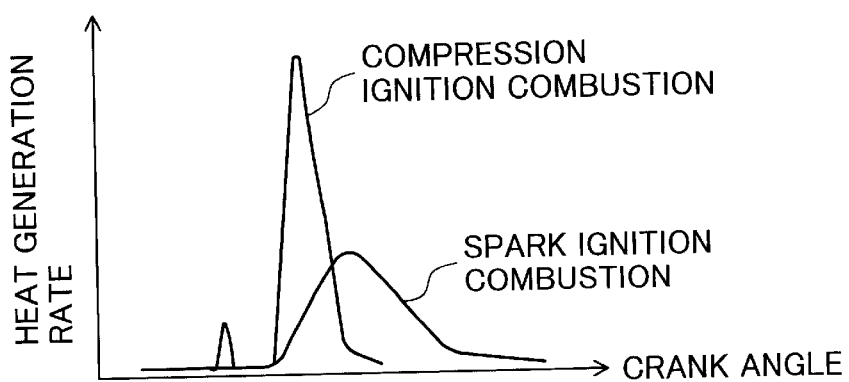
FIG. 32 illustrates a heat generation curve.
Figure 33:
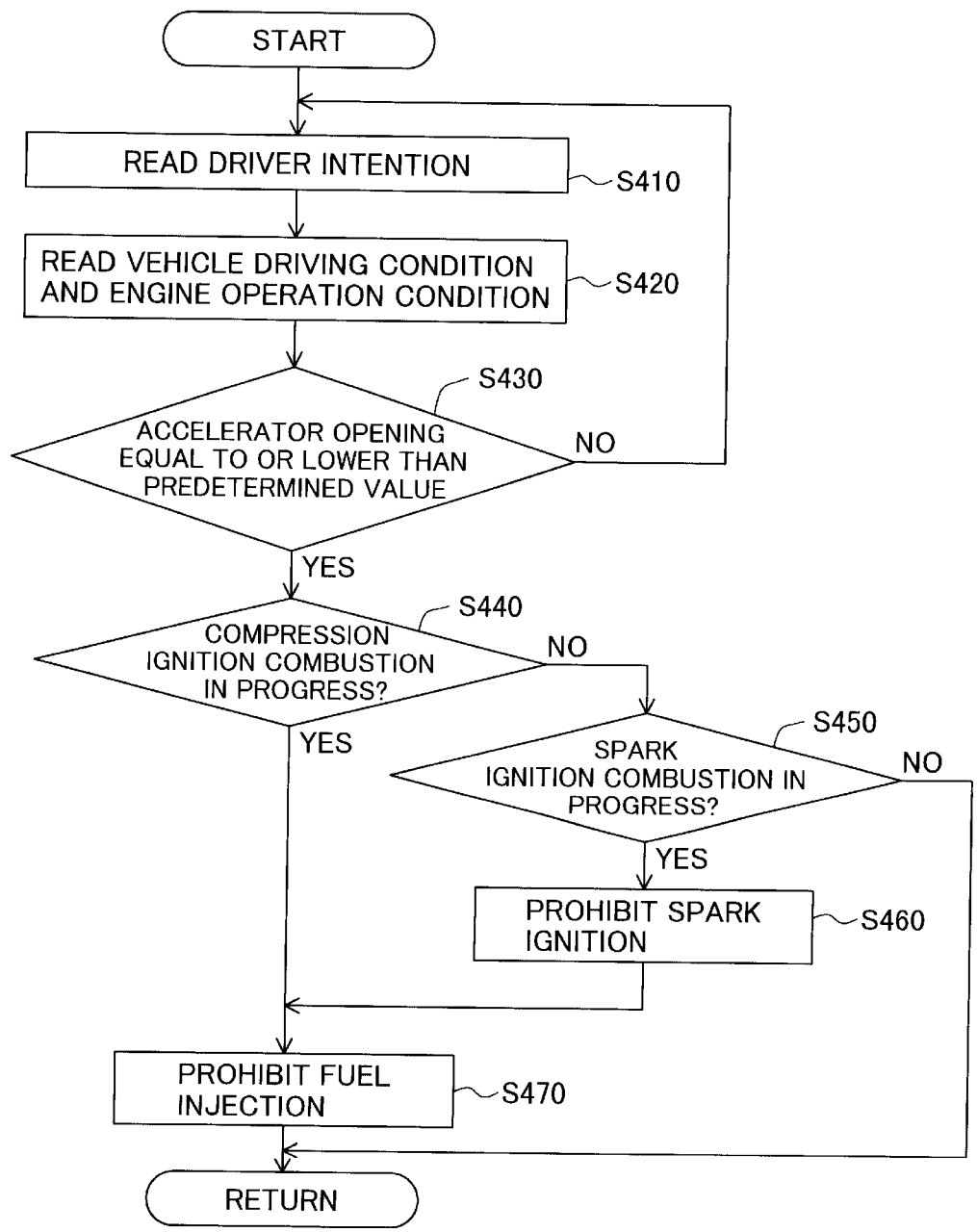
FIG. 33 is a flow chart showing an operation of the compression ignition internal combustion engine according to the seventh embodiment of the present invention when compression ignition is prohibited.

FIG. 31 shows an operating area map to determine a combustion method in the compression ignition internal combustion engine according to the seventh embodiment of the present invention, FIG. 32 illustrates a heat generation curve and FIG. 33 is a flow chart showing an operation of the compression ignition internal combustion engine according to the seventh embodiment of the present invention when compression ignition is prohibited.

In step s160 in FIG. 2, the ECU 1 decides a combustion method, whether a compression ignition combustion mode or a spark ignition combustion mode based on the output values of each sensor and the detecting means read in steps silo to s150. At this time, the ECU 1 decides the combustion method with reference to the operating area map shown in FIG. 31.

As shown in FIG. 31, an operating area Z1 where the accelerator opening is equal to or greater than a predetermined value or where the (absolute value of) acceleration of the vehicle is equal to or greater than a predetermined value corresponds to a spark ignition combustion zone. Furthermore, an operating area Z2 where the accelerator opening is equal to or smaller than a predetermined value and where the (absolute value of) acceleration of the vehicle is equal to or smaller than a predetermined value corresponds to a compression ignition combustion zone. By the way, an operating area Z3 where the accelerator opening is equal to or smaller than a predetermined value and where the (absolute value of) acceleration of the vehicle is equal to or greater than a predetermined value corresponds to a compression ignition combustion prohibition zone, which will be described later by using FIG. 33.

FIG. 32 shows a heat generation rate curve with the horizontal axis showing a crank angle. A compression ignition combustion is known to be a self-ignition combustion that takes place at multiple points simultaneously, and therefore the compression ignition combustion has difficulty in controlling ignition and has a heat generation period shorter than that of a spark ignition combustion as shown in FIG. 32. Furthermore, the compression ignition combustion has specific nature that even if its air-fuel ratio of the mixture can be brought closer to a theoretical air-fuel ratio, the peak of heat generation increases but the combustion period hardly changes, and therefore a drastic pressure rise is accompanied by slapping sound, which makes a stable operation of the engine difficult.

Thus, as shown in FIG. 31, for the operating area Z1, for reasons that greater torque than that during steady driving is required and it is difficult to perform a stable compression ignition combustion operation because an engine operating condition changes drastically, etc., a spark ignition combustion is selected to avoid abrupt heat generation and realize a moderate engine operation. On the other hand, for the operating area Z2, a compression ignition combustion is selected.

Then, control of the operating area Z3 where the accelerator opening is equal to or smaller than a predetermined value and where the (absolute value of) acceleration of the vehicle is equal to or greater than a predetermined value will be explained by using FIG. 33.

First, in step s410, the ECU 1 reads the output value of the accelerator opening detection device 2a as the intention of the driver.

Then, in step s420, the ECU 1 takes in the output value of the vehicle speed detection device 2c as the vehicle driving condition and takes in the output values of the accelerator opening detection device 2a, the air-fuel ratio sensor 22, the crank angle sensor 4, the air flow sensor 5 and the intake air temperature sensor mounted on the air flow sensor 5, the engine cooling water temperature sensor 24 and the post-catalyst exhaust temperature sensor 23 as the engine operating conditions.

Next, in step s430, the ECU 1 decides whether the accelerator opening read in step s410 is equal to or smaller than a predetermined value or not and whether the (absolute value of) vehicle acceleration is equal to or greater than a predetermined value or not and if the value is equal to or smaller than a predetermined value, the ECU 1 moves on to step s440.

When the accelerator opening is equal to or smaller than a predetermined value, in step s440, the ECU 1 decides whether the compression ignition combustion is in progress or not, and the ECU 1 moves on to step s470 if the compression ignition combustion is in progress or step s450 otherwise.

If the compression ignition combustion is not in progress, in step s450, the ECU 1 decides whether the spark ignition combustion is in progress or not, and if the spark ignition combustion is in progress, the ECU 1 moves on to step s460.

Then, in step s460, the ECU 1 shuts off an ignition signal and prohibits spark ignition.

Furthermore, in step s470, the ECU 1 stops fuel injection.

Thus, when the accelerator opening is equal to or smaller than a predetermined value and the (absolute value of) vehicle acceleration is equal to or greater than a predetermined value, the required torque of the engine is zero or minus, and therefore the ECU 1 sends a command to prohibit the compression ignition combustion and shuts off the ignition signal or stops fuel injection. This allows extra fuel consumption to be suppressed, thus reducing HC emissions and fuel consumption.

Furthermore, when the vehicle speed is kept to a predetermined value or higher and when it is decided that the driver of the vehicle has stepped on the accelerator again, the ECU 1 restarts fuel injection and commands for the compression ignition or the spark ignition operation mode based on the intention of the driver, vehicle driving condition, engine operating condition and various sensor values. That is, the embodiment suppresses extra fuel consumption by the engine and allows smooth vehicle driving.

When the required torque of the engine is zero or minus, the embodiment can stop fuel injection and reduce both HC emissions and fuel consumption.

Then, a compression ignition internal combustion engine according to an eighth embodiment of the present invention will be explained by using FIG. 34 and FIG. 35. The system configuration showing a configuration of the compression ignition internal combustion engine according to the embodiment is the same as that shown in FIG. 1. Furthermore, the method of deciding the combustion mode of the compression ignition internal combustion engine according to the embodiment is the same as that in the flow chart shown in FIG. 2.

The embodiment will explain another specific example of the method of deciding the combustion method, whether the compression ignition combustion mode or the spark ignition combustion mode in step s160 in FIG. 2. The embodiment selects the compression ignition combustion mode or the spark ignition combustion mode based on the accelerator opening and vehicle speed.

Figure 34:
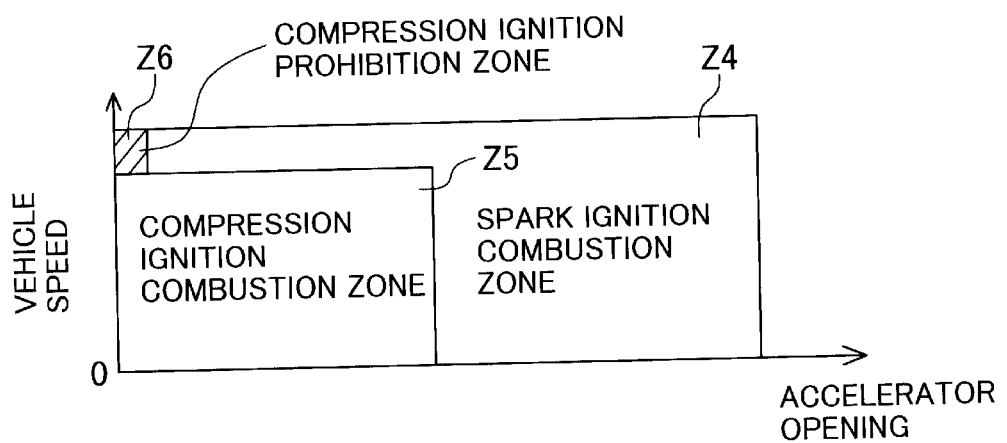
FIG. 34 is an operating area map for deciding a combustion method in a compression ignition internal combustion engine according to an eighth embodiment of the present invention.
Figure 35:
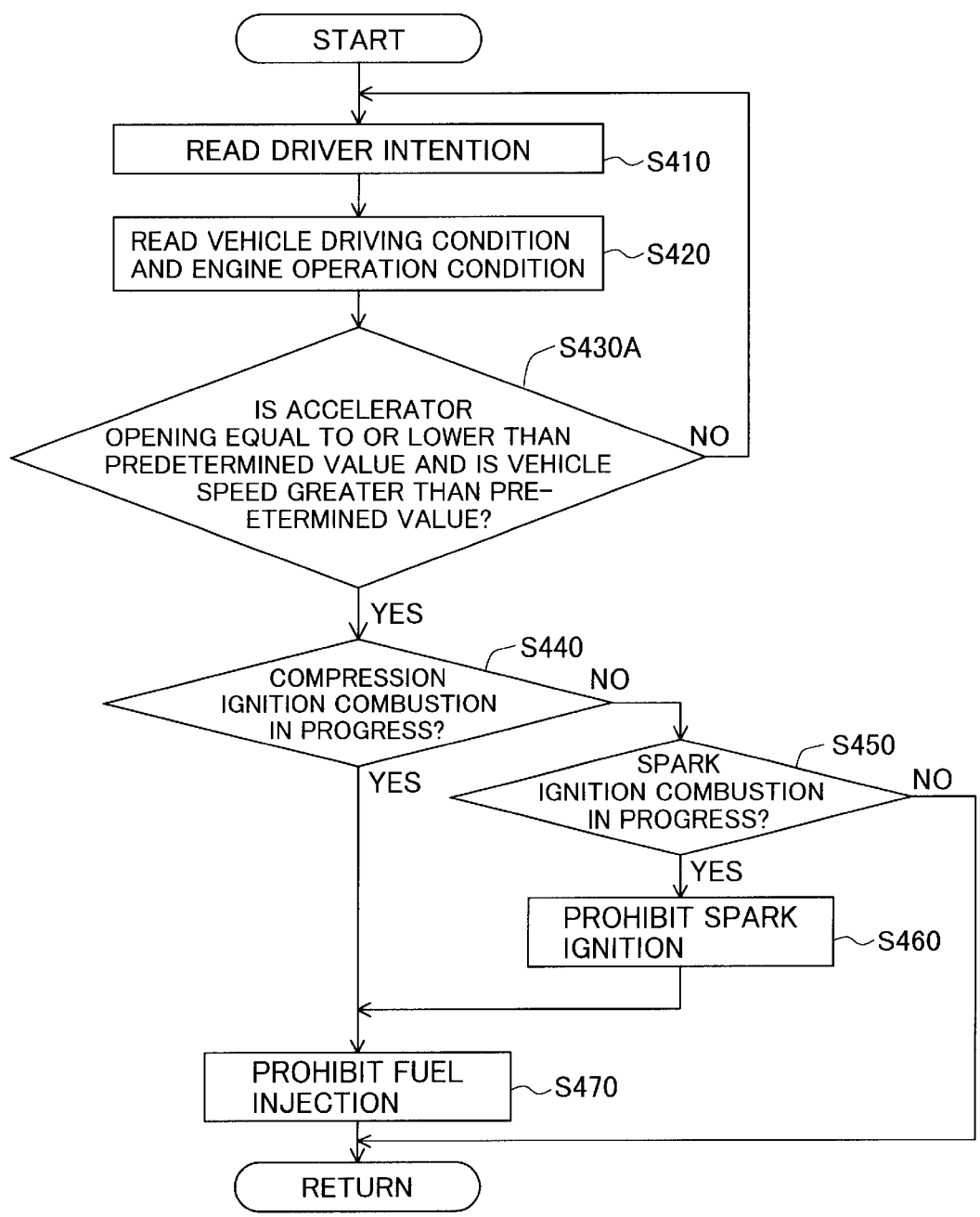
FIG. 35 is a flow chart showing an operation of the compression ignition internal combustion engine according to the eighth embodiment of the present invention when compression ignition is prohibited.

FIG. 34 shows an operating area map to determine a combustion method in the compression ignition internal combustion engine according to the eighth embodiment of the present invention and FIG. 35 is a flow chart showing an operation of the compression ignition internal combustion engine of the eighth embodiment of the present invention when compression ignition is prohibited.

In step s160 in FIG. 2, the ECU 1 decides the combustion method, whether the compression ignition combustion mode or the spark ignition combustion mode based on the output values of each sensor and the detecting means read in steps s110 to s150. At this time, the ECU 1 decides the combustion method with reference to the operating area map shown in FIG. 34.

As shown in FIG. 34, an operating area Z4 where the accelerator opening is equal to or greater than a predetermined value or where the vehicle speed is equal to or greater than a predetermined value corresponds to a spark ignition combustion zone. Furthermore, an operating area Z5 where the accelerator opening is equal to or smaller than a predetermined value and where the vehicle speed is equal to or smaller than a predetermined value corresponds to a compression ignition combustion zone. By the way, an operating area Z6 where the accelerator opening is equal to or smaller than a predetermined value and where the vehicle speed is equal to or greater than a predetermined value corresponds to a compression ignition combustion prohibition zone, which will be described later using FIG. 35.

As shown in FIG. 34, for the operating area Z4, for reasons that greater torque than that during steady driving is required and it is difficult to perform a stable compression ignition combustion operation because an engine operating condition changes drastically, etc., a spark ignition combustion is selected to avoid abrupt heat generation and realize a moderate engine operation. Then, for the operating area Z5, a compression ignition combustion is selected.

Then, control of the operation Z5 where the accelerator opening is equal to or smaller than a predetermined value will be explained by using FIG. 35.

First, in step s410, the ECU 1 reads the output value of the accelerator opening detection device 2a as the intention of the driver.

Then, in step s420, the ECU 1 takes in the output value of the vehicle speed detection device 2c as the vehicle driving condition and takes in the output values of the accelerator opening detection device 2a, the air-fuel ratio sensor 22, the crank angle sensor 4, the air flow sensor 5 and the intake air temperature sensor mounted on the air flow sensor 5, the engine cooling water temperature sensor 24 and the post-catalyst exhaust temperature sensor 23 as the engine operating conditions.

Next, in step s430A, the ECU 1 decides whether the accelerator opening read in step s410 is equal to or smaller than a predetermined value or not and whether the vehicle speed is equal to or greater than a predetermined value or not. If this condition is satisfied, the ECU 1 moves on to step s440.

When the accelerator opening is equal to or smaller than a predetermined value and the vehicle speed is equal to or greater than a predetermined value, in step s440, the ECU 1 decides whether the compression ignition combustion is in progress or not, and the ECU 1 moves on to step s470 if the compression ignition combustion is in progress or step s450 otherwise.

If the compression ignition combustion is not in progress, in step s450, the ECU 1 decides whether the spark ignition combustion is in progress or not, and if the spark ignition combustion is in progress, the ECU 1 moves on to step s460.

Then, in step s460, the ECU 1 shuts off an ignition signal and prohibits spark ignition.

Furthermore, in step s470, the ECU 1 stops fuel injection.

Thus, when the accelerator opening is equal to or smaller than a predetermined value and the vehicle speed is equal to or greater than a predetermined value, it is such a condition that the vehicle is driving on a descending slope and the required torque of the engine is zero or minus, and therefore the ECU 1 sends a command to prohibit a compression ignition combustion and shuts off the ignition signal or stops fuel injection. This allows extra fuel consumption to be suppressed, thus reducing HC emissions and fuel consumption.

When the required torque of the engine is zero or minus, the embodiment can stop fuel injection and reduce both HC emissions and fuel consumption.

Then, a compression ignition internal combustion engine according to a ninth embodiment of the present invention will be explained by using FIG. 36. The system configuration showing a configuration of the compression ignition internal combustion engine according to the embodiment is the same as that shown in FIG. 1. Furthermore, the method of deciding a combustion mode of the compression ignition internal combustion engine according to the embodiment is the same as that in the flow chart shown in FIG. 2.

The embodiment will explain another specific example of the content of control when the driver of the vehicle incorporating the compression ignition internal combustion engine steps on the brake during driving.

Figure 36:
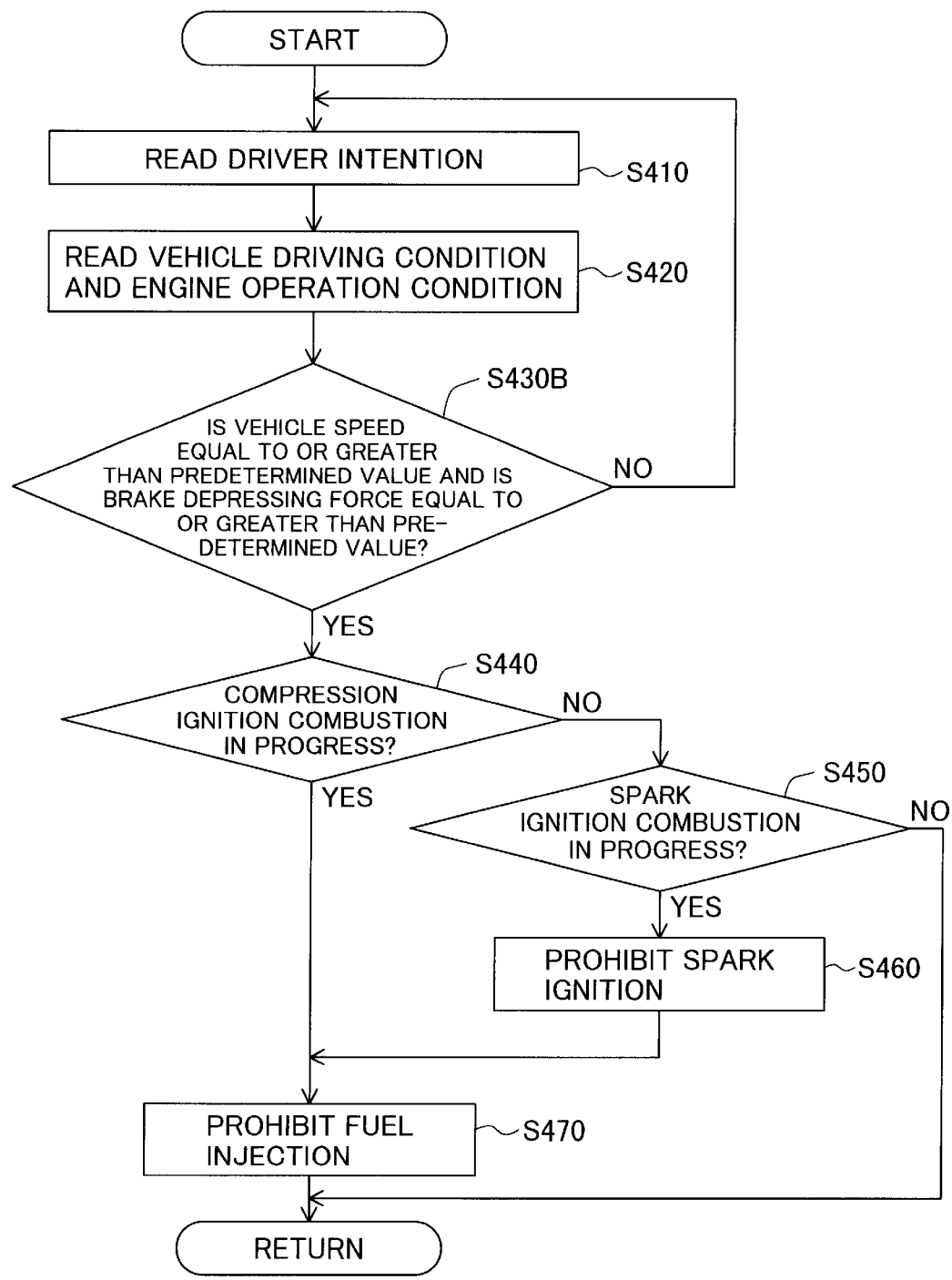
FIG. 36 is a flow chart showing an operation of a compression ignition internal combustion engine according to a ninth embodiment of the present invention when compression ignition is prohibited.

FIG. 36 is a flow chart showing an operation of the compression ignition internal combustion engine according to the ninth embodiment of the present invention when compression ignition is prohibited.

First, in step s410, the ECU 1 reads the output value of the brake depressing force detection device 2b as the intention of the driver.

Then, in step s420, the ECU 1 takes in the output value of the vehicle speed detection device 2c as the vehicle driving condition and takes in the output values of the accelerator opening detection device 2a, the air-fuel ratio sensor 22, the crank angle sensor 4, the air flow sensor 5 and the intake air temperature sensor mounted on the air flow sensor 5, the engine cooling water temperature sensor 24 and the post-catalyst exhaust temperature sensor 23 as the engine operating conditions.

Next, in step s430B, the ECU 1 decides whether the brake depressing force read in step s410 is equal to or greater than a predetermined value or not and whether the vehicle speed is equal to or greater than a predetermined value or not. If this condition is satisfied, the ECU 1 moves on to step s440.

When the brake depressing force is equal to or greater than a predetermined value and the vehicle speed is equal to or greater than a predetermined value, in step s440, the ECU 1 decides whether a compression ignition combustion is in progress or not, and the ECU 1 moves on to step s470 if a compression ignition combustion is in progress or step s450 otherwise.

If a compression ignition combustion is not in progress, in step s450, the ECU 1 decides whether the spark ignition combustion is in progress or not, and if the spark ignition combustion is in progress, the ECU 1 moves on to step s460.

Then, in step s460, the ECU 1 shuts off an ignition signal and prohibits spark ignition.

Furthermore, in step s470, the ECU 1 stops fuel injection.

When the driver who drives the vehicle attempts to decelerate from a normal driving condition, the driver removes his/her foot from the accelerator and steps on the brake. In this case, if the brake depressing force is equal to or greater than a predetermined value, this indicates that the driver of the vehicle incorporating the engine needs an appropriate brake force, and therefore it is necessary to apply a negative pressure to the inside of the intake port 6 to assist the brake and reduce the opening of the throttle valve 7 to almost full closing. Furthermore, the target drive force in this case is zero or minus, and therefore the ECU 1 sends a command to prohibit a compression ignition combustion and shuts off the ignition signal or stops fuel injection. This allows extra fuel consumption to be suppressed, thus reducing HC emissions and fuel consumption.

Furthermore, when the vehicle speed is kept to a predetermined value or greater and it is decided that the driver of the vehicle has stepped on the accelerator again, the ECU 1 restarts fuel injection and commands for the compression ignition or the spark ignition operation mode based on the intention of the driver, the vehicle driving condition, the engine operating condition and the various sensor values. That is, the embodiment suppresses extra fuel consumption by the engine and allows smooth vehicle driving.

When the required torque of the engine is zero or minus, the embodiment can stop fuel injection and reduce both HC emissions and fuel consumption.

Then, a compression ignition internal combustion engine according to a tenth embodiment of the present invention will be explained by using FIG. 37 and FIG. 39.

First, the configuration of the compression ignition internal combustion engine according to the embodiment will be explained by using FIG. 37.

Figure 37:
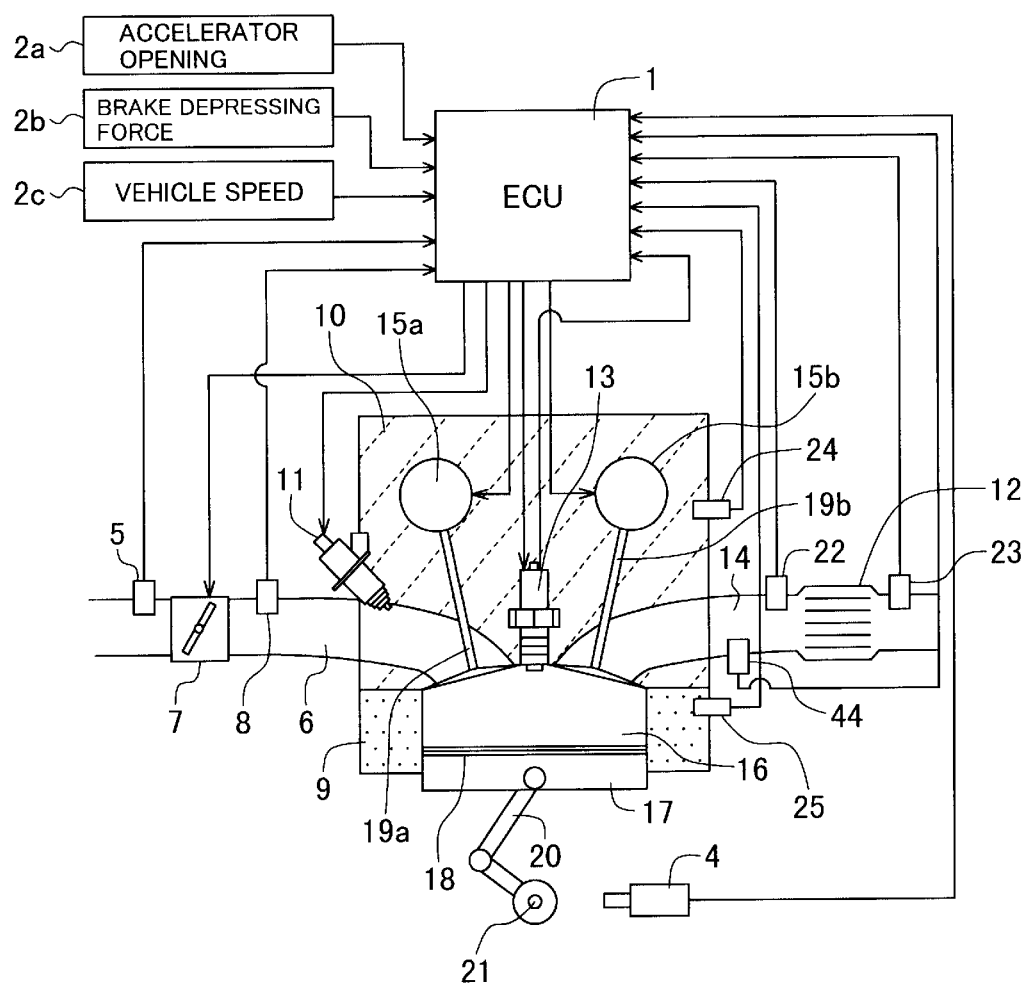
FIG. 37 is a system block diagram showing a, configuration of a compression ignition internal combustion engine according to a tenth embodiment of the present invention.

FIG. 37 is a system block diagram showing a configuration of the compression ignition internal combustion engine according to the tenth embodiment of the present invention. In FIG. 37, the same reference numerals as those in FIG. 1 denote the same parts.

In addition to the configuration shown in FIG. 1, the embodiment is further provided with a temperature sensor 44 in the exhaust port 14. The temperature sensor 44 is used to detect temperature of the exhaust gas. The output value of the temperature sensor 44 is taken into the ECU 1.

Then, the method of deciding a combustion mode in the compression ignition internal combustion engine according to the embodiment will be explained by using FIG. 38.

Figure 38:
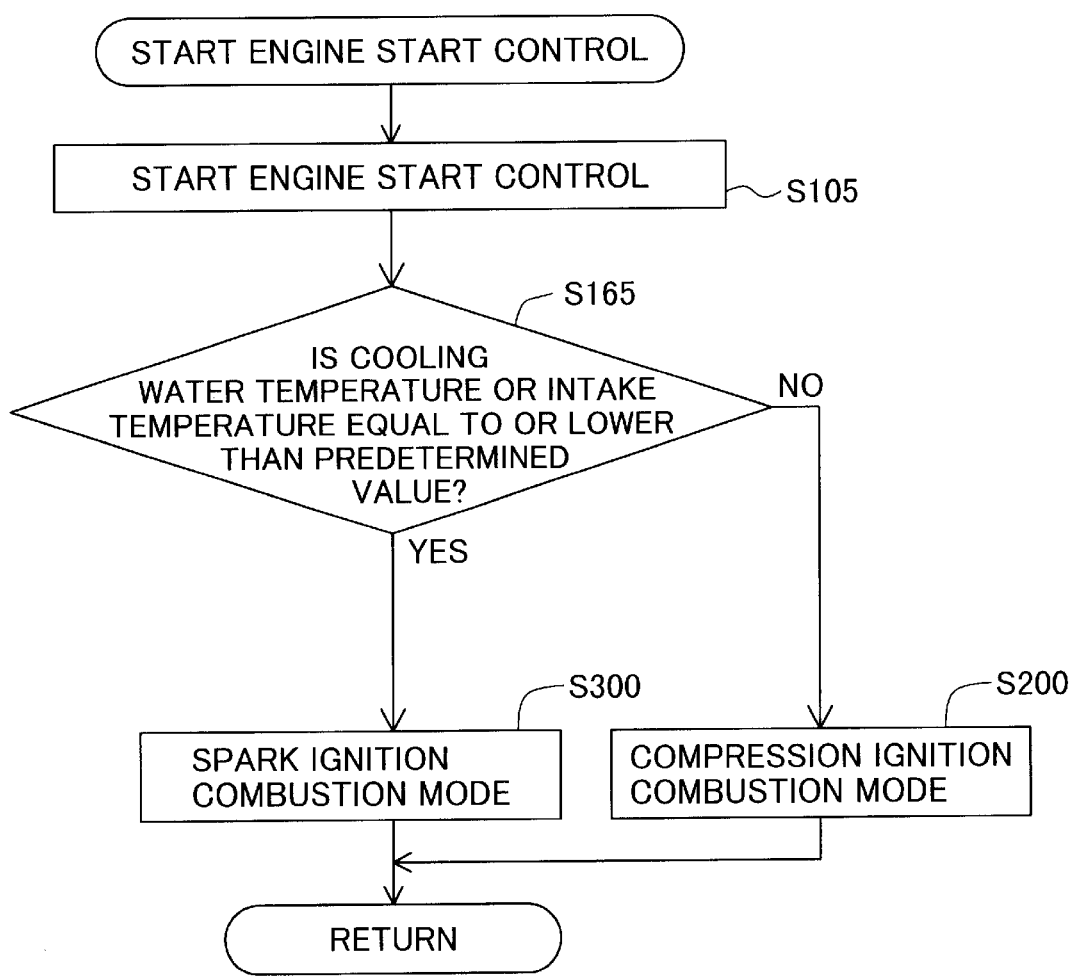
FIG. 38 is a flow chart showing a method of deciding a combustion mode in the compression ignition internal combustion engine according to the tenth embodiment of the present invention.

FIG. 38 is a flow chart showing the method of deciding a combustion mode in the compression ignition internal combustion engine according to the tenth embodiment of the present invention.

When the ECU 1 starts an engine start control, first, in step s105, the ECU 1 reads a cooling water temperature which is the output of the engine cooling water temperature sensor 24 and intake air temperature detected by the air flow sensor 5 as the engine operating conditions.

Then, in step s165, the ECU 1 decides whether the cooling water or intake air temperature read in step s105 is equal to or lower than a predetermined value or not, and if it is equal to or lower than a predetermined value, the ECU 1 moves on to step s300 and starts to control a spark ignition combustion mode. Furthermore, if the read cooling water or intake air temperature is greater than a predetermined value, the ECU 1 moves on to step s200 and starts to control a compression ignition combustion mode.

Ignition timings in a compression ignition combustion mode strongly depend on parameters such as a temperature, pressure and air-fuel ratio and in the case where the temperature of the engine is low as in the case of a cold start and each measuring sensor has not started to function yet and it is difficult to calculate the amount of air, it is extremely difficult to control ignition timings and a combustion period, or fully control the output torque of the engine. Thus, in the case of such a cold start where either the cooling water temperature or intake air temperature of the engine is equal to or lower than a predetermined value, selecting a spark ignition combustion makes it possible to realize a smooth engine start.

Then, a method of controlling switching between combustion modes of the compression ignition internal combustion engine according to the embodiment will be explained by using FIG. 39.

Figure 39:
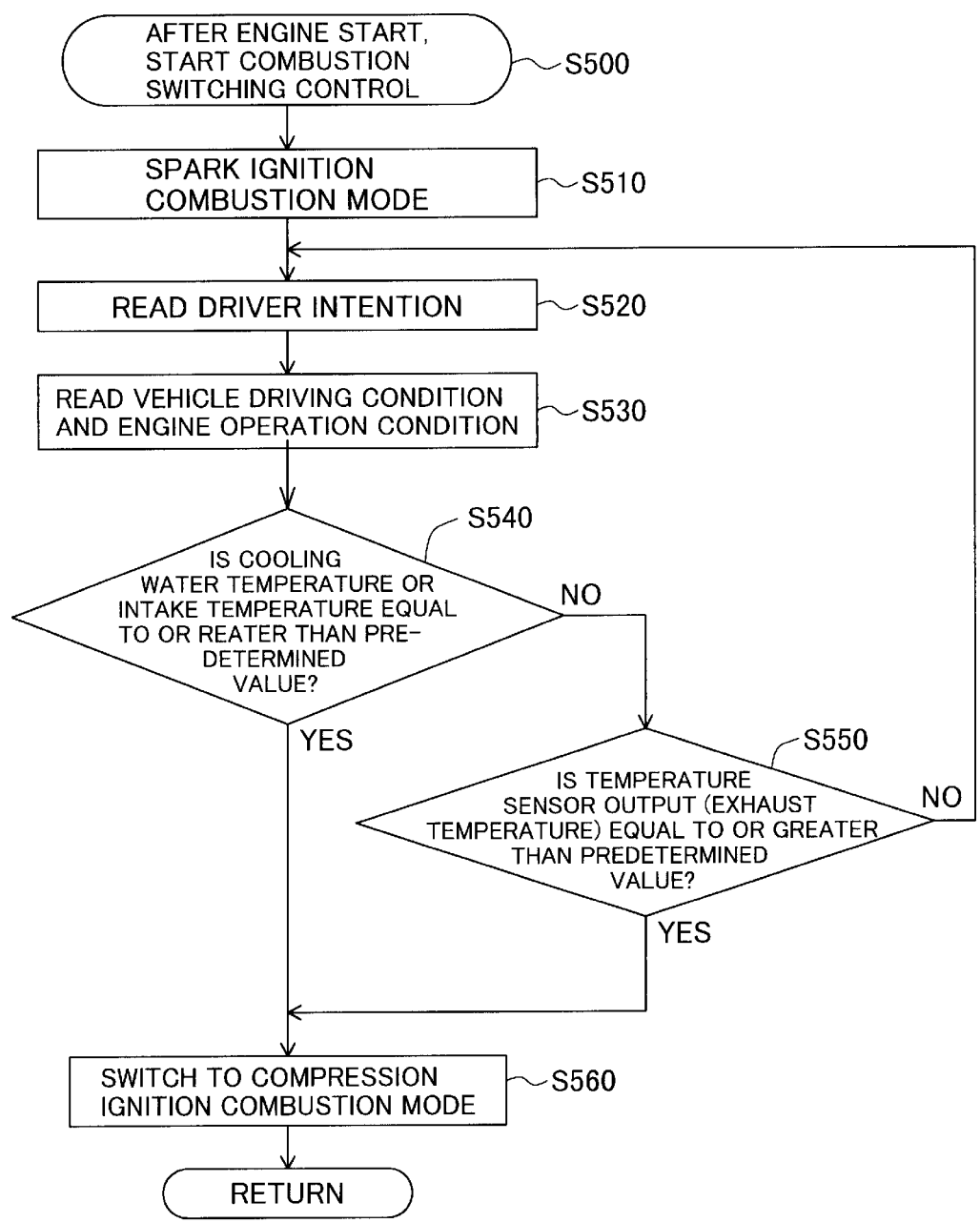
FIG. 39 is a flow chart showing a combustion mode switching control method in the compression ignition internal combustion engine according to the tenth embodiment of the present invention.

FIG. 39 is a flow chart showing a combustion mode switching control method of the compression ignition internal combustion engine according to the tenth embodiment of the present invention.

In step s500, the ECU 1 starts a combustion switching control routine after the engine is started.

First, in step s510, the ECU 1 reads output values of the accelerator opening detection device 2a and the brake depressing force detection device 2b as the intention of the driver.

Then, in step s520, the ECU 1 takes in an output value of vehicle speed detection device 2c as the vehicle driving condition and takes in output values of the accelerator opening detection device 2a, the air-fuel ratio sensor 22, the crank angle sensor 4, the air flow sensor 5 and the intake air temperature sensor mounted on the air flow sensor 5, the engine cooling water temperature sensor 24 and the post-catalyst exhaust temperature sensor 23 as the engine operating conditions.

Then, in step s530, the ECU 1 decides whether the cooling water temperature or intake air temperature is equal to or greater than a predetermined value or not based on the information read in steps s210 to s220 and if both are equal to or greater than a predetermined value, the ECU 1 moves on to step s560. If not, the ECU 1 moves on to step s550 and decides whether the output of the exhaust temperature sensor is equal to or greater than a predetermined value and if it is equal to or greater than a predetermined value, the ECU 1 moves on to step s560.

Then, when: the cooling water temperature and intake air temperature become equal to or greater than a predetermined value or when the output value of the temperature sensor 44 becomes equal to or greater than a predetermined value, in step s560, ECU 1 switches from a spark ignition combustion to compression ignition combustion because an initial temperature in the combustion chamber 16 at the start of a compression, that is, at timing at which the intake valve 19a closes is secured by an amount necessary for ignition. At this time, it is also possible to use the output value of the post-catalyst exhaust temperature sensor 23 instead of the output value of the temperature sensor 44, and using this output value makes it possible to decide whether a compression starting temperature enough to start ignition has been secured or not.

The embodiment makes it possible to select a combustion mode according to a cooling water temperature or exhaust temperature at the start of the engine and improve a starting characteristic, and after the engine is started, immediately start the compression ignition combustion mode if conditions are ready.

As described above, the compression ignition internal combustion engine described in the aforementioned embodiments is an engine system that makes compatible a self-ignition combustion with a spark ignition combustion and can control an amount of internal EGR, amount of intake air and compression ignition timings independently by controlling the intake air regulating device and the variable valve mechanisms according to the intention of the driver, vehicle driving condition and engine operating condition. That is, the present invention has excellent advantages of making compatible an increase in a compression self-ignition operating area with an optimum output torque control in this operating area and also smoothly switching between a self-ignition combustion and a spark ignition combustion, and can thereby realize low NOx and low HC fuel consumption.

INDUSTRIAL APPLICABILITY

The present invention makes compatible an increase in compression self-ignition operating area with an optimum output torque control in this operating area and also smoothly switches a self-ignition combustion and a spark ignition combustion.

What is claimed is:

1. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means controls said variable valve mechanisms so as to reduce valve lifts of said exhaust valve during a compression ignition combustion.

2. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means decides an amount of fuel injection according to engine operating conditions of said compression ignition internal combustion engine, a vehicle driving condition of a vehicle incorporating said compression ignition internal combustion engine and an intention of a driver of said vehicle incorporating said compression ignition internal combustion engine, calculates a target amount of intake air from said decided amount of fuel injection so as to attain a target air-fuel ratio and controls said variable valve mechanisms and said intake air regulating means so that the amount of air intake into said combustion chamber becomes the target amount of air.

3. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means decides an amount of fuel injection according to engine operating conditions of said compression ignition internal combustion engine, a vehicle driving condition of a vehicle incorporating said compression ignition internal combustion engine and an intention of a driver of said vehicle incorporating said compression ignition internal combustion engine, calculates a target amount of intake air from said decided amount of fuel injection so as to attain a target air-fuel ratio and controls said variable valve mechanisms and said intake air regulating means so that an ignition timing becomes a target ignition timing.

4. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means decides a target amount of intake air according to engine operating conditions of said compression ignition internal combustion engine, a vehicle driving condition of a vehicle incorporating said compression ignition internal combustion engine and an intention of a driver of said vehicle incorporating said compression ignition internal combustion engine and controls said variable valve mechanisms and said intake air regulating means so that an air-fuel ratio becomes a target air-fuel ratio.

5. A compression ignition internal combustion engine according to claim 4, wherein said control means further performs feedback control so that an ignition timing becomes a target ignition timing.

6. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means operates said intake valve or said exhaust valve according to engine operating conditions of said compression ignition internal combustion engine, a vehicle driving condition of a vehicle incorporating said compression ignition internal combustion engine and an intention of a driver of said vehicle incorporating said compression ignition internal combustion engine and controls fuel injecting means and said intake air regulating means so that an air-fuel ratio becomes a target air-fuel ratio.

7. A compression ignition internal combustion engine according to claim 6, wherein said control means further performs feedback control so that an ignition timing becomes a target ignition timing.

8. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means controls said variable valve mechanisms, said fuel injecting means and said intake air regulating means according to engine operating conditions of said compression ignition internal combustion engine, a vehicle driving condition of a vehicle incorporating said compression ignition internal combustion engine and an intention of a driver of the vehicle incorporating said compression ignition internal combustion engine so that an air-fuel ratio becomes a target air-fuel ratio.

9. A compression ignition internal combustion engine according to claim 8, wherein said control means performs feedback control so that an ignition timing becomes a target ignition timing.

10. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means operates said intake air regulating means according to engine operating conditions of said compression ignition internal combustion engine, a vehicle driving condition of a vehicle incorporating said compression ignition internal combustion engine and an intention of a driver of said vehicle incorporating said compression ignition internal combustion engine and controls said fuel injecting means and said variable valve mechanisms so that an air-fuel ratio becomes a target air-fuel ratio.

11. A compression ignition internal combustion engine according to claim 10, wherein said control means further performs feedback control so that an ignition timing coincides with a target ignition timing.

12. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means controls said variable valve mechanisms so that the intake valve has small lifts and the closing timing of the intake valve is advanced during an operating condition is in a low-speed and low-load state.

13. A compression ignition internal combustion engine according to claim 12, wherein said control means maximizes an amount of intake air by said intake air regulating means while keeping an internal EGR rate constant.

14. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means controls said variable valve mechanisms or said intake air regulating means so that a temperature of a mixture inside said combustion chamber increases at the start of a compression process as an engine speed increases in an operating area by said compression ignition combustion so as to increase an internal EGR rate.

15. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means controls so that an amount of fuel injection increases as an engine speed increases in an operating area by said compression ignition combustion.

16. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means controls so that an air-fuel ratio approaches a theoretical air-fuel ratio as an engine speed increases in an operating area by said compression ignition combustion.

17. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein when said compression ignition combustion is switched to said spark ignition combustion, said control means controls said variable valve mechanisms so that an internal EGR rate is reduced compared with that during said compression ignition combustion.

18. A compression ignition internal combustion engine according to claim 17, wherein when said compression ignition combustion is switched to said spark ignition combustion, said control means controls said intake air regulating means so that an amount of intake air changes continuously.

19. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said intake air regulating means is provided in a flow channel that bypasses an intake path.

20. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said intake air regulating means is provided by a supercharger which supplies supercharged air into said combustion chamber and said control means controls the amount of air to be supplied by controlling the supercharging pressure of this supercharger.

21. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means controls for switching said spark ignition combustion and said compression ignition combustion according to engine operating conditions of this compression ignition internal combustion engine, a vehicle driving condition of said vehicle incorporating said compression ignition internal combustion engine and an intention of a driver of said vehicle incorporating said compression ignition internal combustion engine.

22. A compression ignition internal combustion engine according to claim 21, wherein when an accelerator opening is equal to or greater than a predetermined value or when a vehicle acceleration is equal to or greater than a predetermined value, said engine is operated by said spark ignition combustion.

23. A compression ignition internal combustion engine according to claim 21, wherein when an accelerator opening is equal to or greater than a predetermined value or when the vehicle speed is equal to or greater than a predetermined value, said engine is operated by said spark ignition combustion.

24. A compression ignition internal combustion engine according to claim 21, wherein when a vehicle speed is equal to or greater than a predetermined value and a brake depressing force is equal to or greater than a predetermined value, engine operation by said compression ignition combustion is prohibited.

25. A compression ignition internal combustion engine according to claim 21, wherein when a cooling water temperature and a an intake air temperature are equal to or lower than a predetermined value, said engine is operated by said spark ignition combustion.

26. A compression ignition internal combustion engine according to claim 25, wherein when an exhaust temperature is equal to or higher than a predetermined value, engine operation is switched to operation by said compression ignition combustion.

27. A compression ignition internal combustion engine for operating by switching a spark ignition combustion using an ignition device and a compression ignition combustion for self-igniting a mixture by piston compression comprising:

variable valve mechanisms for varying at least one of valve timings and valve lifts of an intake valve and an exhaust valve;

intake air regulating means for varying an amount of air intake into a combustion chamber on an upstream side of a combustion chamber inlet of the compression ignition internal combustion engine; and control means for controlling said variable valve mechanisms and said intake air regulating means during a compression ignition combustion so as to perform a compression ignition combustion;

wherein said control means prohibits engine operation by said compression ignition combustion according to engine operating conditions of said compression ignition internal combustion engine, a vehicle driving condition of a vehicle incorporating said compression ignition internal combustion engine and an intention of a driver of the vehicle incorporating said compression ignition internal combustion engine.

28. A compression ignition internal combustion engine for operating by switching a spark ignition combustion using an ignition device and a compression ignition combustion for self-igniting a mixture by piston compression, wherein a switching engine operation between said spark ignition combustion and said compression ignition combustion according to engine operating conditions of said compression ignition internal combustion engine, a vehicle driving condition of a vehicle incorporating said compression ignition internal combustion engine and an intention of a driver of said vehicle incorporating said compression ignition internal combustion engine.

29. A compression ignition internal combustion engine according to claim 28, wherein when an accelerator opening is equal to or greater than a predetermined value or a vehicle acceleration is equal to or greater than a predetermined value, engine operation is performed by said spark ignition combustion.

30. A compression ignition internal combustion engine according to claim 28, wherein when an accelerator opening is equal to or greater than a predetermined value or a vehicle speed is equal to or greater than a predetermined value, engine operation is performed by said spark ignition combustion.

31. A compression ignition internal combustion engine according to claim 28, wherein when a vehicle speed is equal to or greater than a predetermined value and a brake depressing force is equal to or greater than a predetermined value, engine operation by said compression ignition combustion is prohibited.

32. A compression ignition internal combustion engine according to claim 28, wherein when a cooling water temperature and a an intake air temperature are equal to or lower than a predetermined value, engine operation is performed by said park ignition combustion.

33. A compression ignition internal combustion engine according to claim 32, wherein when an exhaust temperature is equal to or higher than a predetermined value, engine operation is switched to operation by said compression ignition combustion.

34. A compression ignition internal combustion engine for operating switching a spark ignition combustion using an ignition device and a compression ignition combustion for self-igniting mixture by piston compression, wherein engine operation by said compression ignition combustion is prohibited according to engine operating conditions of said compression ignition internal combustion engine, a vehicle driving condition of a vehicle incorporating this compression ignition internal combustion engine and an intention of a driver of said vehicle incorporating said compression ignition internal combustion engine.

35. A compression ignition internal combustion engine according to claim 34, wherein when an accelerator opening is equal to or greater than a predetermined value or a vehicle acceleration is equal to or greater than a predetermined value, engine operation is performed by said spark ignition combustion.

36. A compression ignition internal combustion engine according to claim 34, wherein when an accelerator opening is equal to or greater than a predetermined value or a vehicle speed is equal to or greater than a predetermined value, engine operation is performed by said spark ignition combustion.

37. A compression ignition internal combustion engine according to claim 34, wherein when a vehicle speed is equal to or greater than a predetermined value and a brake depressing force is equal to or greater than a predetermined value, engine operation by said compression ignition combustion is prohibited.

38. A compression ignition internal combustion engine according to claim 34, wherein when a cooling water temperature and an intake air temperature are equal to or lower than a predetermined value, engine operation is performed by said spark ignition combustion.

39. A compression ignition internal combustion engine according to claim 38, wherein when an exhaust temperature is equal to or higher than a predetermined value, engine operation is switched to operation by said compression ignition combustion.

* * * * *